United States Patent
Roo et al.

(10) Patent No.: US 7,606,547 B1
(45) Date of Patent: **\*Oct. 20, 2009**

(54) ACTIVE RESISTANCE SUMMER FOR A TRANSFORMER HYBRID

(75) Inventors: Pierte Roo, Sunnyvale, CA (US); Sehat Sutardja, Cupertino, CA (US)

(73) Assignee: Marvell International Ltd., Hamilton (BM)

( \* ) Notice: Subject to any disclaimer, the term of this patent is extended or adjusted under 35 U.S.C. 154(b) by 749 days.

This patent is subject to a terminal disclaimer.

(21) Appl. No.: 09/920,240

(22) Filed: Aug. 1, 2001

Related U.S. Application Data

(63) Continuation-in-part of application No. 09/629,092, filed on Jul. 31, 2000, now Pat. No. 6,775,529.

(51) Int. Cl.
*H04B 1/10* (2006.01)
*H04B 3/20* (2006.01)
*H04B 1/38* (2006.01)

(52) U.S. Cl. ............... 455/296; 455/295; 455/278.1; 455/63.1; 455/67.13

(58) Field of Classification Search .............. 455/296, 455/295, 278.1, 63.1, 67.13, 570, 301; 370/286, 370/289
See application file for complete search history.

(56) References Cited

U.S. PATENT DOCUMENTS

| | | |
|---|---|---|
| 3,297,951 A | 1/1967 | Blasbalg |
| 3,500,215 A | 3/1970 | Leuthold et al. |
| 3,521,170 A | 7/1970 | Leuthold et al. |
| 3,543,009 A | 11/1970 | Voelcker |
| 3,793,589 A | 2/1974 | Puckette |
| 3,973,089 A | 8/1976 | Puckett |
| 4,071,842 A | 1/1978 | Tewksbury |
| 4,112,253 A | 9/1978 | Wilhelm ............... 178/58 R |
| 4,131,767 A | 12/1978 | Weinstein |
| 4,152,541 A | 5/1979 | Yuen ..................... 178/59 |
| RE30,111 E | 10/1979 | Blood, Jr. .............. 178/58 R |
| 4,309,673 A | 1/1982 | Norberg et al. |
| 4,321,753 A | 3/1982 | Fusari |
| 4,362,909 A | 12/1982 | Snijders et al. |
| 4,393,370 A | 7/1983 | Hareyama |

(Continued)

FOREIGN PATENT DOCUMENTS

DE   10 2004 017 497   11/2004

(Continued)

OTHER PUBLICATIONS

U.S. Appl. No. 09/629,905, filed Jul. 31, 2000, Pierte Roo.

(Continued)

*Primary Examiner*—Eugene Yun

(57) ABSTRACT

An electrical circuit in a communications channel includes a first sub-circuit having a first input which receives a composite signal that includes a transmission signal component and a receive signal component, a second input which receives a replica transmission signal, a third input which receives an analog baseline correction current, and an output which provides a receive signal which comprises the composite signal minus the replica signal. A second sub-circuit for controls the analog baseline correction current, so that the magnitude of the composite signal does not exceed a predetermined value of an operating parameter of the electrical circuit. The composite signal, the replica transmission signal, and the analog baseline correction current are directly connected together at a common node of the first sub-circuit.

108 Claims, 7 Drawing Sheets

U.S. PATENT DOCUMENTS

| | | | |
|---|---|---|---|
| 4,393,494 A | 7/1983 | Belforte et al. ............... 370/27 |
| 4,408,190 A | 10/1983 | Nagano |
| 4,464,545 A | 8/1984 | Werner |
| 4,503,421 A | 3/1985 | Hareyama |
| 4,527,126 A | 7/1985 | Petrich et al. |
| 4,535,206 A | 8/1985 | Falconer |
| 4,591,832 A | 5/1986 | Fling et al. |
| 4,605,826 A | 8/1986 | Kanemasa |
| 4,621,172 A | 11/1986 | Kanemasa et al. |
| 4,621,356 A | 11/1986 | Scipione |
| 4,626,803 A | 12/1986 | Holm |
| 4,715,064 A | 12/1987 | Claessen |
| 4,727,566 A | 2/1988 | Dahlqvist |
| 4,746,903 A | 5/1988 | Czarniak et al. |
| 4,816,830 A | 3/1989 | Cooper |
| 4,817,081 A | 3/1989 | Wouda et al. |
| 4,868,571 A | 9/1989 | Inamasu |
| 4,878,244 A | 10/1989 | Gawargy |
| 4,888,762 A | 12/1989 | Arai |
| 4,894,820 A | 1/1990 | Miyamoto |
| 4,935,919 A | 6/1990 | Hiraguchi |
| 4,947,171 A | 8/1990 | Pfiefer et al. |
| 4,970,715 A | 11/1990 | McMahan |
| 4,972,360 A | 11/1990 | Cukier et al. |
| 4,988,960 A | 1/1991 | Tomisawa |
| 4,993,045 A | 2/1991 | Alfonso |
| 4,999,830 A | 3/1991 | Agazzi |
| 5,018,134 A | 5/1991 | Kokubo et al. |
| 5,043,730 A | 8/1991 | Obinnata |
| 5,084,865 A | 1/1992 | Koike |
| 5,119,365 A | 6/1992 | Warner et al. |
| 5,136,260 A | 8/1992 | Yousefi-Elezei |
| 5,148,427 A | 9/1992 | Buttle et al. |
| 5,153,450 A | 10/1992 | Ruetz |
| 5,164,725 A | 11/1992 | Long |
| 5,175,764 A * | 12/1992 | Patel et al. ................... 379/412 |
| 5,185,538 A | 2/1993 | Kondoh et al. |
| 5,202,528 A | 4/1993 | Iwaooji |
| 5,204,880 A | 4/1993 | Wurster et al. |
| 5,212,659 A | 5/1993 | Scott et al. |
| 5,222,084 A | 6/1993 | Takahashi |
| 5,243,346 A | 9/1993 | Inami |
| 5,243,347 A | 9/1993 | Jackson et al. |
| 5,245,231 A | 9/1993 | Kocis et al. |
| 5,245,654 A | 9/1993 | Wilkison et al. |
| 5,248,956 A | 9/1993 | Himes |
| 5,253,249 A | 10/1993 | Fitzgerald et al. |
| 5,253,272 A | 10/1993 | Jaeger et al. |
| 5,254,994 A | 10/1993 | Takakura et al. |
| 5,267,269 A | 11/1993 | Shih et al. |
| 5,269,313 A | 12/1993 | DiPinto |
| 5,272,453 A | 12/1993 | Traynor et al. |
| 5,280,526 A | 1/1994 | Laturell |
| 5,282,157 A | 1/1994 | Murphy et al. |
| 5,283,582 A | 2/1994 | Krenik |
| 5,305,379 A | 4/1994 | Takeuchi |
| 5,307,064 A | 4/1994 | Kudoh |
| 5,307,405 A | 4/1994 | Sih ............................. 379/410 |
| 5,323,157 A | 6/1994 | Ledzius et al. |
| 5,325,400 A | 6/1994 | Co et al. |
| 5,357,145 A | 10/1994 | Segaram |
| 5,365,935 A | 11/1994 | Righter et al. |
| 5,367,540 A | 11/1994 | Kakushi et al. |
| 5,373,147 A | 12/1994 | Awata et al. |
| 5,375,147 A | 12/1994 | Awata et al. |
| 5,388,092 A | 2/1995 | Koyama et al. ............ 370/32.1 |
| 5,388,123 A | 2/1995 | Uesugi et al. |
| 5,392,042 A | 2/1995 | Pellon |
| 5,399,996 A | 3/1995 | Yates et al. |
| 5,418,478 A | 5/1995 | Van Brunt et al. |
| 5,440,514 A | 8/1995 | Flannagan et al. |
| 5,440,515 A | 8/1995 | Chang et al. |
| 5,444,739 A | 8/1995 | Uesugi et al. |
| 5,465,272 A | 11/1995 | Smith |
| 5,471,665 A | 11/1995 | Pace et al. |
| 5,479,124 A | 12/1995 | Pun et al. |
| 5,489,873 A | 2/1996 | Kamata et al. |
| 5,507,036 A | 4/1996 | Vagher |
| 5,508,656 A | 4/1996 | Jaffard et al. |
| 5,517,141 A | 5/1996 | Abdi et al. |
| 5,517,435 A | 5/1996 | Sugiyama ............... 364/724.19 |
| 5,521,540 A | 5/1996 | Marbot |
| 5,537,113 A | 7/1996 | Kawabata |
| 5,539,403 A | 7/1996 | Tani et al. |
| 5,539,405 A | 7/1996 | Norsworthy |
| 5,539,773 A | 7/1996 | Knee et al. ................... 375/232 |
| 5,559,476 A | 9/1996 | Zhang et al. |
| 5,568,064 A | 10/1996 | Beers et al. |
| 5,568,142 A | 10/1996 | Velazquez et al. |
| 5,572,158 A | 11/1996 | Lee et al. |
| 5,572,159 A | 11/1996 | McFarland |
| 5,577,027 A | 11/1996 | Cheng |
| 5,579,004 A | 11/1996 | Linz |
| 5,585,795 A | 12/1996 | Yuasa et al. |
| 5,585,802 A | 12/1996 | Cabler et al. |
| 5,587,681 A | 12/1996 | Fobbester |
| 5,589,788 A | 12/1996 | Goto |
| 5,596,439 A * | 1/1997 | Dankberg et al. ............. 398/35 |
| 5,600,321 A | 2/1997 | Winen |
| 5,613,233 A | 3/1997 | Vagher |
| 5,615,234 A | 3/1997 | Brooks |
| 5,625,357 A | 4/1997 | Cabler |
| 5,629,652 A | 5/1997 | Weiss |
| 5,648,738 A | 7/1997 | Welland et al. |
| 5,651,029 A | 7/1997 | Yang et al. |
| 5,659,609 A | 8/1997 | Koizumi et al. ............. 379/410 |
| 5,663,728 A | 9/1997 | Essenwanger |
| 5,666,354 A | 9/1997 | Cecchi et al. ............... 370/284 |
| 5,684,482 A | 11/1997 | Galton |
| 5,687,330 A | 11/1997 | Gist et al. |
| 5,696,796 A | 12/1997 | Poklemba |
| 5,703,541 A | 12/1997 | Nakashima |
| 5,719,515 A | 2/1998 | Danger |
| 5,726,583 A | 3/1998 | Kaplinsky |
| 5,745,564 A | 4/1998 | Meek |
| 5,745,839 A | 4/1998 | Lieberman |
| 5,757,219 A | 5/1998 | Weedon et al. |
| 5,757,298 A | 5/1998 | Manley et al. |
| 5,760,726 A | 6/1998 | Koifman et al. |
| 5,790,060 A | 8/1998 | Tesche |
| 5,790,658 A | 8/1998 | Yip et al. |
| 5,796,725 A | 8/1998 | Muraoka ..................... 370/290 |
| 5,798,661 A | 8/1998 | Runaldue et al. |
| 5,798,664 A | 8/1998 | Nagahori et al. |
| 5,812,597 A | 9/1998 | Graham et al. |
| 5,821,892 A | 10/1998 | Smith |
| 5,822,426 A | 10/1998 | Rasmus et al. ............. 379/402 |
| 5,825,819 A | 10/1998 | Cogburn ..................... 375/257 |
| 5,834,860 A | 11/1998 | Parsons et al. |
| 5,838,177 A | 11/1998 | Keeth |
| 5,838,186 A | 11/1998 | Inoue et al. |
| 5,841,386 A | 11/1998 | Leduc |
| 5,841,809 A | 11/1998 | Koizumi et al. |
| 5,844,439 A | 12/1998 | Zortea |
| 5,859,552 A | 1/1999 | Do et al. |
| 5,864,587 A | 1/1999 | Hunt ........................... 375/316 |
| 5,880,615 A | 3/1999 | Bazes |
| 5,887,059 A | 3/1999 | Xie et al. |
| 5,894,496 A | 4/1999 | Jones |
| 5,898,340 A | 4/1999 | Chatterjee et al. |
| 5,930,686 A | 7/1999 | Devlin et al. |
| 5,936,450 A | 8/1999 | Unger |
| 5,940,442 A | 8/1999 | Wong et al. |
| 5,940,498 A | 8/1999 | Bardl |

| | | | |
|---|---|---|---|
| 5,949,362 A | 9/1999 | Tesche et al. |
| 5,963,069 A | 10/1999 | Jefferson et al. |
| 5,982,317 A | 11/1999 | Steensgaard-Madsen |
| 5,999,044 A | 12/1999 | Wohlfarth et al. |
| 6,005,370 A | 12/1999 | Gustavson |
| 6,014,048 A | 1/2000 | Talaga et al. |
| 6,037,812 A | 3/2000 | Gaudet |
| 6,038,266 A | 3/2000 | Lee et al. |
| 6,043,766 A | 3/2000 | Hee et al. |
| 6,044,489 A | 3/2000 | Hee et al. |
| 6,046,607 A | 4/2000 | Kohdaka |
| 6,047,346 A | 4/2000 | Lau et al. |
| 6,049,706 A | 4/2000 | Cook et al. |
| 6,052,076 A | 4/2000 | Patton, III et al. |
| 6,057,716 A | 5/2000 | Dinteman et al. |
| 6,067,327 A | 5/2000 | Creigh et al. |
| 6,087,968 A | 7/2000 | Roza |
| 6,094,082 A | 7/2000 | Gaudet |
| 6,100,830 A | 8/2000 | Dedic |
| 6,121,831 A | 9/2000 | Mack |
| 6,137,328 A | 10/2000 | Sung |
| 6,140,857 A | 10/2000 | Bazes |
| 6,148,025 A | 11/2000 | Shirani et al. |
| 6,150,856 A | 11/2000 | Morzano |
| 6,154,784 A | 11/2000 | Liu |
| 6,163,283 A | 12/2000 | Schofield |
| 6,163,289 A | 12/2000 | Ginetti |
| 6,163,579 A | 12/2000 | Harrington et al. |
| 6,166,572 A | 12/2000 | Yamaoka |
| 6,172,634 B1 | 1/2001 | Leonowich et al. |
| 6,173,019 B1 | 1/2001 | Hee et al. |
| 6,177,896 B1 | 1/2001 | Min |
| 6,185,263 B1 | 2/2001 | Chan |
| 6,188,282 B1 | 2/2001 | Montalvo |
| 6,191,719 B1 | 2/2001 | Bult et al. |
| 6,192,226 B1 | 2/2001 | Fang |
| 6,201,490 B1 | 3/2001 | Kawano et al. |
| 6,201,831 B1 | 3/2001 | Agazzi et al. |
| 6,204,788 B1 | 3/2001 | Tani |
| 6,211,716 B1 | 4/2001 | Nguyen et al. |
| 6,215,429 B1 | 4/2001 | Fischer et al. |
| 6,223,061 B1 | 4/2001 | Dacus et al. |
| 6,236,345 B1 | 5/2001 | Dagnachew et al. |
| 6,236,346 B1 | 5/2001 | Schofield |
| 6,236,645 B1 | 5/2001 | Agazzi |
| 6,249,164 B1 | 6/2001 | Cranford, Jr. et al. |
| 6,249,249 B1 | 6/2001 | Obayashi et al. |
| 6,259,680 B1 | 7/2001 | Blackwell et al. |
| 6,259,745 B1 | 7/2001 | Chan |
| 6,259,957 B1 | 7/2001 | Alexander et al. |
| 6,266,367 B1 | 7/2001 | Strait |
| 6,271,782 B1 | 8/2001 | Steensgaard-Madsen |
| 6,275,098 B1 | 8/2001 | Uehara et al. |
| 6,289,068 B1 | 9/2001 | Hassoun et al. |
| 6,295,012 B1 | 9/2001 | Greig |
| 6,298,046 B1 | 10/2001 | Thiele |
| 6,307,490 B1 | 10/2001 | Litfin et al. |
| 6,309,077 B1 | 10/2001 | Saif et al. |
| 6,288,604 B1 | 11/2001 | Shih et al. |
| 6,313,775 B1 | 11/2001 | Lindfors et al. |
| 6,332,004 B1 | 12/2001 | Chan |
| 6,333,959 B1 | 12/2001 | Lai et al. |
| 6,339,390 B1 | 1/2002 | Velazquez et al. |
| 6,340,940 B1 | 1/2002 | Melanson |
| 6,346,899 B1 | 2/2002 | Hadidi |
| 6,351,229 B1 | 2/2002 | Wang |
| RE37,619 E | 4/2002 | Mercer et al. |
| 6,369,734 B2 | 4/2002 | Volk |
| 6,370,190 B1 | 4/2002 | Young et al. |
| 6,373,417 B1 | 4/2002 | Melanson |
| 6,373,908 B2 | 4/2002 | Chan |
| 6,377,640 B2 | 4/2002 | Trans |
| 6,377,683 B1 | 4/2002 | Dobson et al. |
| 6,385,238 B1 | 5/2002 | Nguyen et al. |
| 6,385,442 B1 | 5/2002 | Vu et al. |
| 6,389,077 B1 | 5/2002 | Chan |
| 6,408,032 B1 | 6/2002 | Lye et al. |
| 6,411,647 B1 | 6/2002 | Chan |
| 6,415,003 B1 | 7/2002 | Raghaven |
| 6,421,377 B1 | 7/2002 | Langberg et al. |
| 6,421,534 B1 | 7/2002 | Cook et al. |
| 6,433,608 B1 | 8/2002 | Huang |
| 6,441,761 B1 | 8/2002 | Viswanathan |
| 6,452,428 B1 | 9/2002 | Mooney et al. |
| 6,462,688 B1 | 10/2002 | Sutardja |
| 6,476,746 B2 | 11/2002 | Viswanathan |
| 6,476,749 B1 | 11/2002 | Yeap et al. |
| 6,477,200 B1 | 11/2002 | Agazzi et al. |
| 6,492,922 B1 | 12/2002 | New |
| 6,501,402 B2 | 12/2002 | Boxho |
| 6,509,854 B1 | 1/2003 | Morita et al. |
| 6,509,857 B1 | 1/2003 | Nakao |
| 6,531,973 B2 | 3/2003 | Brooks et al. |
| 6,535,987 B1 | 3/2003 | Ferrant |
| 6,539,072 B1 | 3/2003 | Donnelly et al. |
| 6,556,677 B1 | 4/2003 | Hardy |
| 6,563,870 B1 | 5/2003 | Schenk |
| 6,570,931 B1 | 5/2003 | Song |
| 6,577,114 B1 | 6/2003 | Roo |
| 6,583,742 B1 | 6/2003 | Hossak |
| 6,594,304 B2 | 7/2003 | Chan |
| 6,606,489 B2 | 8/2003 | Razavi et al. |
| 6,608,743 B1 | 8/2003 | Suzuki |
| 6,633,178 B2 | 10/2003 | Wilcox et al. |
| 6,687,286 B1 | 2/2004 | Leonowich et al. |
| 6,690,742 B2 | 2/2004 | Chan |
| 6,714,825 B1 | 3/2004 | Tanaka |
| 6,721,379 B1 | 4/2004 | Cranford, Jr. et al. |
| 6,731,748 B1 | 5/2004 | Edgar et al. |
| 6,744,831 B2 | 6/2004 | Chan |
| 6,744,931 B2 | 6/2004 | Komiya et al. |
| 6,751,202 B1 | 6/2004 | Henrie |
| 6,765,931 B1 * | 7/2004 | Rabenko et al. ............. 370/493 |
| 6,775,529 B1 * | 8/2004 | Roo ........................... 455/296 |
| 6,816,097 B2 | 11/2004 | Brooks et al. |
| 6,823,028 B1 | 11/2004 | Phanse |
| 6,844,837 B1 | 1/2005 | Sutardja et al. |
| 6,864,726 B2 | 3/2005 | Levin et al. |
| 6,870,881 B1 * | 3/2005 | He ............................. 375/233 |
| 6,882,216 B2 | 4/2005 | Kang |
| 6,975,674 B1 | 12/2005 | Phanse et al. ............... 375/219 |
| 6,980,644 B1 * | 12/2005 | Sallaway et al. ............ 379/391 |
| 7,050,517 B1 * | 5/2006 | Sallaway et al. ............ 375/350 |
| 2001/0050585 A1 | 12/2001 | Carr |
| 2002/0009057 A1 | 1/2002 | Blackwell et al. |
| 2002/0061087 A1 | 5/2002 | Williams |
| 2002/0084857 A1 | 7/2002 | Kim |
| 2002/0136321 A1 | 9/2002 | Chan |
| 2002/0181601 A1 | 12/2002 | Huang et al. |
| 2003/0002570 A1 | 1/2003 | Chan |
| 2003/0174660 A1 | 9/2003 | Blon et al. |
| 2004/0005015 A1 | 1/2004 | Chan |
| 2004/0090981 A1 | 5/2004 | Lin et al. |
| 2004/0091071 A1 | 5/2004 | Lin et al. |
| 2004/0105504 A1 | 6/2004 | Chan |
| 2004/0141569 A1 | 7/2004 | Agazzi |
| 2004/0208312 A1 | 10/2004 | Okuda |
| 2005/0025266 A1 | 2/2005 | Chan |

FOREIGN PATENT DOCUMENTS

| | | |
|---|---|---|
| EP | 0 800 278 | 8/1997 |
| JP | 57-48827 | 3/1982 |
| JP | 58-111415 | 7/1983 |
| JP | 62-159925 | 7/1987 |
| JP | 63-300700 | 7/1988 |

| | | |
|---|---|---|
| JP | 63-300700 | 12/1988 |
| JP | 204527 | 8/1989 |
| JP | 3-273704 | 12/1991 |
| JP | 4-293306 | 10/1992 |
| JP | 4-351109 | 12/1992 |
| JP | 05-064231 A | 3/1993 |
| JP | 06-029853 | 2/1994 |
| JP | 06-97831 | 4/1994 |
| JP | 6-276182 | 9/1994 |
| JP | 7-131260 | 5/1995 |
| JP | 09-55770 | 8/1995 |
| JP | 09-270707 | 10/1997 |
| JP | 10-126183 | 5/1998 |
| JP | 2001-177409 | 6/2001 |
| TW | 0497334 | 8/2002 |
| TW | 0512608 | 12/2002 |
| TW | 0545016 | 8/2003 |
| WO | WO 99/46867 | 9/1999 |
| WO | WO 00/27079 | 5/2000 |
| WO | WO 00/28663 | 5/2000 |
| WO | WO 00/28663 A3 | 5/2000 |
| WO | WO 00/28668 | 5/2000 |
| WO | WO 00/28691 | 5/2000 |
| WO | WO 00/28691 A3 | 5/2000 |
| WO | WO 00/28712 | 5/2000 |
| WO | WO 00/35094 | 6/2000 |

OTHER PUBLICATIONS

U.S. Appl. No. 09/920,241, filed Aug. 1, 2001, Pierte Roo.
"Microelectronic Circuits," Third Edition, Sedra et al., Chapter 2: Operational Amplifiers, §2.4, pp. 61-63, 1991.
Stephens, "Active Output Impedance for ASDL Line Drivers", Nov. 2002.
Hellwarth, et al., "Digital-to-analog Converter having Common-mode Isolation and Differential Output".
Millman, et al., "Pulse, Digital, and Switching Waveforms", pp. 674-675.
Dally, et al., "Digital Systems Engineering", cover and pp. 390-391.
Hamasaki, et al., "A 3-V, 22-mV, Multibit Current-Mode ΣΔ DAC with 100 dB Dynamic Range", Dec. 1996, pp. 1888-1894.
Van de Plassche, Integrated Analog-to-Digital and Digital-to-Analog Converters—Chapter 6, pp. 211-271.
Lee, et al., "A CMOS Serial Link for Fully Duplexed Data Communication", Apr. 1995.
Song, et al., FP 12.1: NRZ Timing Recovery Technique for Band-Limited Channels, 1996.
Song, et al., FP 12.1: NRZ Timing Recovery Technique for Band-Limited Channels (Slide Supplement), 1996.
Chien, et al., "TP 12.4: A 900-MHz Local Oscillator using a DLL-based Frequency Multiplier Technique for PCS Applications".
Chien, "Monolithic CMOS Frequency Synthesizer for Cellular Applications", Mar. 12-13.
Chien, "Delay Based Monolithic CMOS Frequency Synthesizer for Portable Wireless Applications", May 20, 1998.
Chien, "Low-Noise Local Oscillator Design Techniques using DLL-based Frequency Multiplier for Wireless Applications", 2000.
Wang, et al., "A 1.2 GHz Programmable DLL-Based Frequency Multiplier for Wireless Applications", Dec. 2004.
Tsutomu Kamoto, "An 8-bit 2-ns Monolithic DAC", Feb. 1988.
Nack, et al., "A Constant Slew Rate Ethernet Line Driver", May 2001.
Song, "Dual Mode Transmitter with Adaptively Controlled Slew Rate and Impedance Supporting Wide Range Data Rates", 2001.
Johns, et al., "Integrated Circuits for Data Transmission Over Twisted Pair Channels", Mar. 1997, pp. 398-406.
"IEEE Standard 802.3: Part 3 Carrier Sense Multiple Access with Collision Detection (CSMA/CD) Access Method and Physical Detection", Mar. 8, 2002, pp. 1-378.
Young, et al., "A Low-Noise RF Voltage-Controlled Oscillator Using On-Chip High-Q Three-Dimensional Coil Inductor and Micromachined Variable Capacitor", Jun. 8-11, 1998, pp. 128-131.
Young, et al., "A Micromachined Variable Capacitor for Monolithic Low-Noise VCOS", 1996, pp. 86-89.
Abidi, et al., "FA 7.2: The Future of CMOS Wireless Transceivers", Feb. 7, 1997, pp. 118-119, 440.
Eto, et al., "A 333 MHz, 20mW, 18ps Resolution Digital DLL using Current-controlled Delay with Parallel Variables Resistor DAC (PVR-DAC)", Aug. 28-30, 2000, pp. 349-350.
Harald, et al., "Design of a 10-bit 100 MSamples/s BiCMOS D/A Converter", 1996, pp. 730-733.
Lee, et al., "A 3V 10b 100MS/s Digital-to-Analog Converter for Cable Modem Applications", Aug. 28-30, 2000, pp. 203-205.
Henriques, et al., "A CMOS Steering-Current Multiplying Digital-to-Analog Converter", 1995, pp. 145-155.
Wikner, et al., "Modeling of CMOS Digital-to-Analog Converters for Telecommunication", May 1999, pp. 489-499.
Van der Plas, et al., "A 14-Bit Intrinsic Accuracy $Q_2$ Random Walk CMOS DAC", Dec. 1999, pp. 1708-1718.
Radke, et al., "A 14-Bit Current-Mode ΣΔ DAC Based Upon Rotated Data Weighted Averaging", Aug. 2000, pp. 1074-1084.
Shui, et al., "Mismatch Shaping for a Current-Mode Multibit Delta-Sigma DAC", Mar. 1999, pp. 331-338.
Weaver, Jr., "A Third Method of Generation and Detection of Single-Sideband Signals," Dec. 1956, pp. 1703-1705.
Niknejad et al., "Analysis and Optimization of Monolithic Inductors and Transformers for RF ICs," 1997, pp. 375-378.
Weigandt et al., "Analysis of Timing Jitters in CMOS Ring Oscillators," pp. 27-30.
Niknejad et al., "Analysis, Design, and Optimization of Spiral Inductors and Transformers for Si RF IC's," Oct. 1998, pp. 1470-1481.
Gray et al., Analysis and Design of Analog Integrated Circuits, Fourth Edition.
American National Standard, "Fibre Distributed Data Interface (FDDI)—Token Ring Twisted Pair Layer Medium Dependent (TP-PMD)," Sep. 25, 1995.
Nguyen et al., "Si IC-Compatible Inductors and LC Passive Filters," Aug. 1990, pp. 1028-1031.
Gardner, "Charge-Pump Phase-Lock Loops," Nov. 1980, pp. 1849-1858.
Dally et al., "High Performance Electrical Signaling."
Davies, "Digital Generation of Low-Frequency Sine Waves," Jun. 1969, pp. 97-105.
Abidi, "TP 11.1: Direct-Conversion Radio Transceivers for Digital Communications," 1995.
Dolle, "A Dynamic Line-Termination Circuit for Multireceiver Nets," Dec. 1993, pp. 1370-1373.
Su et al., "Experimental Results and Modeling Techniques for Substrate Noise in Mixed-Signal Integrated Circuits," Apr. 1993, pp. 420-430.
Gray et al., "Future Directions in Silicon ICs for RF Personal Communications," 1995, pp. 83-90.
Gabara, "On-Chip Terminating Registers for High Speed ECL-CMOS Interfaces," 1992, pp. 292-295.
Horowitz et al., "High-Speed Electrical Signaling: Overview and Limitations," 1998, pp. 12-24.
Kim et al., "A 30-MHz Hybrid Analog/Digital Clock Recovery Circuit in 2-μm CMOS," 1990, pp. 1385-1394.
Liu et al., "WP 23.7: A 6.5 GHz Monolithic CMOS Voltage-Controlled Oscillator," 1999, pp. 404-405, 484.
Wang et al., "WP 23.8: A 9.8 GHz Back-Gate Tuned VCO in 0.35 μm CMOS," 1999, pp. 406-407, 484.
Rofougaran et al., "SP 24.6: A 900 MHz CMOS LC-Oscillator with Quadrature Outputs," 1996.
Koullias et al., "TP 9.2: A 900 MHz Transceiver Chips Set for Dual-Mode Cellular Radio Mobile Terminals," 1993, pp. 140-141, 278.
Dauphinee et al., "SP 23.7: A Balanced 1.5 GHz Voltage Controlled Oscillator with an Integrated LC Resonator," 1997, pp. 390-391, 491.
Banu et al., "A BiCMOS Double-Low-IF Receiver for GSM," 1997, pp. 521-524.
Chang et al., "A CMOS Channel-Select Filter for a Direct-Conversion Wireless Receiver," 1996, pp. 62-63.
Waizman, "FA 18.5: A Delay Line Loop for Frequency Synthesis of De-Skewed Clock," Feb. 18, 1994, pp. 298-299.
Kinget, "FP 14.7: A Fully Integrated 2.7V 0.35 μm CMOS VCO for 5 GHz Wireless Applications," Feb. 5, 1998.

Lee et al., "A Fully Integrated Low-Noise 1-GHz Frequency Synthesizer Design for Mobile Communication Application," May 1997, pp. 760-765.
Parker et al., "A Low-Noise 1.6-GHz CMOS PLL with On-Chip Loop Filter," 1997, pp. 407, 409-410.
Park et al., "A Low-Noise, 900-MHz VCO in 0.6 µm CMOS," May 1999, pp. 586-591.
Soyuer et al., "A Monolithic 2.3-Gb/s 100-mW Clock and Data Recovery Circuit in Silicon Bipolar Technology," Dec. 1993, pp. 1310-1313.
Hu et al., "A Monolithic 480 Mb/s Parallel AGC/Decision/Clock-Recovery Circuit in 1.2-µm CMOS," Dec. 1993, pp. 1314-1320.
Parameswaran et al., "A New Approach for the Fabrication of Micromechanical Structures," Dec. 6, 1998, pp. 289-307.
Cho et al., "TP 13.5: A Single-Chip CMOS Direct-Conversion Transceiver for 900 MHz Spread-Spectrum Digital Cordless Phones," 1999, pp. 228-229, 464.
Sedra et al., Microelectronic Circuits, Third Edition, 1991, pp. 86-92.
Moon et al., "An All Analog Multiphase Delay Locked Loop Using a Replica Delay Line for Wide Range Operation and Low-Jitter Performance," Mar. 2000, pp. 377-384.
I.E.E.E. Standard 802.3: Part 3, "Carrier Sense Multiple Access with Collision Detection (CSMA/CD) Access Method and Physical Detection," Mar. 8, 2002, pp. 1-378.
Shoval et al., "WA 18.7—A Combined 10/125 Mbaud Twisted-Pair Line Driver with Programmable Performance/Power Features," 2000, pp. 314-315.
Myson Technology, "MTD214—Ethernet Encoder/Decoder and 10BaseT Transceiver with Built-in Waveform Shaper," 1997, pp. 1-11.
Myson Technology, "MTD972 (Preliminary) 100BaseTX PCS/PMA," 1997, pp. 1-21.
Craninckx et al., "A 1.8-GHz Low-Phase-Noise CMOS VCO Using Optimized Hollow Spiral Inductors," 1997, pp. 736-744.
Craninckx et al., "A 1.8-GHz Low-Phase-Noise CMOS VCO Using Optimized Hollow Spiral Inductors," 1995, pp. 1474-1482.
Hung et al., "A 1.24-GHz Monolithic CMOS VCO with Phase Noise of 137 dBc/Hz at a 3-MHz Offset," 1999, pp. 111-113.
Rudell et al., "A 1.9-GHz Wide-Band IF Double Conversion CMOS Receiver for Cordless Telephone Applications," 1997, pp. 2071-2088.
Lin et al., "TP 12.5: A 1.4 GHz Differential Low-Noise CMOS Frequency Synthesizer using a Wideband PLL Architecture," 2000, pp. 204-205, 458.
Razavi, "SP 23.6: A 1.8 GHz CMOS Voltage-Controlled Oscillator," 1997, pp. 388-389.
Dec et al., "MP 4.8: A 1.9 GHz Micromachine-Based Low-Phase-Noise CMOS VCO," 1999, pp. 80-81, 449.
Sato et al., "SP 21.2: A 1.9 GHz Single-Chip IF Transceiver for Digital Cordless Phones," Feb. 10, 1996.
Rudell et al., "SA 18.3: A 1.9 GHz Wide-band IF Double Conversion CMOS Integrated Receiver for Cordless Telephone Applications," 1997, pp. 304-305, 476.
Lee et al., "A 2.5 V CMOS Delay-Locked Loop for an 18 Mbit, 500 Megabytes/s DRAM," 1994, pp. 1491-1496.
Leong et al., "A 2.7-V 900-MHz/1.9-GHz Dual-Band Transceiver IC for Digital Wireless Communication," 1999, pp. 286-291.
Lam et al., "WP 23.6: A 2.6 GHz/5.2 GHz CMOs Voltage-Controlled Oscillator," 1999, pp. 402-403, 484.
Marshall et al., "TA 8.7: A 2.7V GSM Transceiver ICs with On-Chip Filtering," 1995.
Sedra et al., Microelectronic Circuits, 3rd ed., 1991.
Yee et al., An Integratable 1-2.5 Gbps Low Jitter CMOS Transceiver with Built in Self Test Capability, 1999.
Intersil, HC-5509B ITU CO/Loop Carrier SLIC, Aug. 2003.
Regan, ADSL Line Driver/Receiver Design Guide, Part 1, Feb. 2000.
Phillps, The HC-5502X14X Telephone Subscriber Line Interface Circuits (SLIC), Jan. 1997.
Fuad Et al., An Operational Amplifier Circulator Based on the Weighted Summer, Jun. 1975.
Narayanan et al., Doppler Estimation Using a Coherent Ultrawide-Band Random Noise Radar, Jun. 2000.

Stephens, Active Output Impedance for ADLS Line Drivers, Nov. 2002.
High Speed Modem Solutions Infor Card 20.
Hellums et al., An ADSL Integrated Active Hybrid Circuit.
Everitt et al., A CMOS Transceiver for 10-Mb/s and 100-Mb/s Ethernet, Dec. 1998.
Azadet et al., A Gigabit Transceiver Chip Set for UTP CA-6 Cables in Digital CMOS Technology, Feb. 2000.
He et al., A DSP Receiver for 1000 Base-T PHY, 2001.
Baird et al., A Mixed Sample 120M s PRML Solution for DVD Systems, 1999.
Baker, An Adaptive Cable Equalizer for Serial Digital Rates to 400Mb/s, 1996.
Chan et al., A 100 Mb/s CMOS 100Base-T4 Fast Ethernet Transceiver for Category 3, 4 & 5 UTP, 1998.
Everitt et al., A 10/100Mb/s CMOS Ethernet Transceiver for 10BaseT, 10BaseTX and 100Base FX, 1998.
Kelly et al., A Mixed Signal DFE/Ffe Reciever for 100BaseTX Applications, 2000.
Shoaei et al., A 3V Low Power 0.25um CMOS 100Mb/s Receiver for Fast Ethernet, 2000.
Walker et al., A Two Chip 1.5 GBd Serial Link Interface, Dec. 1992.
Linear Technology High Speed Modem Solutions Info Card.
Mueller, Combining Echo Cancellation and Decision Feedback Equalization, Feb. 29, 1979.
Roo et al., A CMOS Transceiver Analog Front-end for Gigabit Ethernet over Cat-5 Cables, 2001.
Shoval, A Combined 10/125 Mbaud Twisted Pair Line Driver with Programmable Performance/Power Features, 2000.
Knight, Jr. et al., A Self-Terminating Low-Voltage Swing CMOS Output Driver, 1988, 457-464.
Maneatis, Low-Jitter Process-Independent DLL and PLL Based on Self-Biased Techniques, Nov. 1996, 1723-1732.
Chang et al., Large Suspended Inductors on Silicon and Their Use in a 1-um CMOS RF Amplifier, May 1993, 246-248.
Gharpurey et al., Modeling and Analysis of Substrate Coupling in Integrated Circuits, Mar. 1996, 344-353.
Young et al., Monolithic High-Performance three-Dimensional Coil Inductors for Wireless Communications, 1997.
Efendovich et al., Multifrequency Zero-Jitter Delay-Locked Loop, Jan. 1994, 67-70.
Munshi et al., Adaptive Impedance Matching, 69-72.
Niknejad et al., Numerically Stable Green Function for Modeling and Analysis to Substrate Coupling in Integrated Circuits, Apr. 1998, 305-315.
Hajimiri et al., Phase Noise in Multi-Gigahertz CMOS Ring Oscillators, 1998, 49-52.
Kim et al., PLL/DLL System Noise Analysis for Low Jitter Clock Synthesizer Design, 31-34.
Rudell et al., Recent Developments in High Integration Multi-Standard CMOS Transceivers for Personal Communication Systems, 1998, 149-154.
Shoval et al., A 100 Mb/s BiCMOS Adaptive Pulse-Shaping Filter, Dec. 1995, 1692-1702.
Jansen et al., SP 23.8: Silicon Bipolar VCO Family for 1.1 to 2.2 GHz with Fully-Integrated Tank and Tuning Circuits, Feb. 8, 1997, 392-393 & 492.
Falconer; "Echo Cancellation in Two Wire Full Duplex With Estimation of Far-End Data Components"; Aug. 13, 1985..
Gawargy; "Electronic Hybrid Circuit"; Oct. 31, 1989.
Cho et al.; "A Single-Chip CMOS Direct Conversion Transceiver for 900 MHz Spread-Spectrum Digital Cordless Telephones"; 1999.
Shoval et al.; "A CMOS Mixed-Signal 100Mb/s Receive Architecture for Fast Ethernet"; 1999.
Hester et al.; "CODEC for Echo-Canceling Full-Rate ADSL Modems"; Dec. 1999.
U.S. Appl. No. 60/106,265, filed Oct. 30, 1998, Chan.
U.S. Appl. No. 60/107,105, filed Nov. 4, 1998, Chan.
U.S. Appl. No. 60/107,702, filed Nov. 9, 1998, Chan.
U.S. Appl. No. 60/108,001, filed Nov. 11, 1998, Chan.
Rao, Short Course: Local Area Networks.
Razavi, Principles of Data Conversion System Design.
Mano, Digital Logic and Computer Design.

Farjad-rad, et al., 4.5 A 0.2-2GHz 12mW Multiplying DLL for Low-Jitter Clock Synthesis in Highly Integrated Data Communication Chip.

Gotoh, et al., All-Digital Multi-Phase Delay Locked Loop for Internal Timing Generation in Embedded and/or High-Speed DRAMS.

Johnson, et al., THAM 11.2: A Variable Delay Line Phase Locked Loop for CPU-Coprocessor Synchronization.

Sonntag, et al., FAM: 11.5: A Monolithic CMOS 10MHz DPLL for Burse-Mode.

Garlepp, et al., A Portable Digital DLL Architecture for CMOS Interface Circuits.

Lin, et al., A Register-Controller Symmetrical DLL for Double-Data-Rate DRAM.

Garlepp, et al., A Portable Digital DLL for High-Speed CMOS Interface Circuits.

Dehng, et al., Clock-Deskaw Buffer Using a SAR-Controlled Delay-Locked Loop.

Kim, et al., A Low-Power Small-Area 7.28-ps-Jitter 1-GHz DLL-Based Clock Generator.

Dehng, et al., A Fast-Lock Mixed-Mode DLL Using a 2-b SAR Algorithm.

Lin, et al., A 10-b, 500-Msample/s CMOS DAC in 0.6mm2.

Sedra, et al., Microelectronic Circuits, 3rd Edition, 1991.

Gray, et al., Analysis and Design of Analog Integrated Circuits, pp. 270 & 274.

Gray et al., Analysis and Design of Analog Integrated Circuits, Fourth Edition, pp. 217-221.

Dally, et al., "Digital Systems Engineering", cover and pp. 390-391.

Stonick et al; An Adaptive PAM-4 5-Gb/s Backplane Transceiver in 0.25-um CMOS; IEEE Journal of Solid-State Circuits, vol. 38, No. 3, Mar. 2003; pp. 436-443.

Dunning, Jim, "An All-Digital Phase-Locked Loop with 50-Cycle Lock Time Suitable for High-Performance Microprocessros," IEEE Journal of Solid-State Circuits, vol. 30, No. 4, Apr. 1995, pp. 412-422.

Moon, Yongsam, et al., "An All-Analog Multiphase Delay-Locked Loop Using a Replica Delay Line for Wide-Range Operation and Low-Jitter Performance," IEEE Journal of Solid-State Circuits, vol. 35, No. 3, Mar. 2000, pp. 377-384.

Rudell, et al., "SA 18.3: A 1.9 GHz Wide-Bank IF Double Conversion CMOS Integrated Receiver for Cordless Telephone Applications," 1997, pp. 304-305, 476.

Garlepp, Bruno W., et al., "18.3 A Portable Digital DLL Architecture for CMOS Interface Circuits," 1998 Symposium on VLSI Circuits Digest of Technical Papers, pp. 214-215.

Sedra et al., Microelectronic Circuits, Third Edition, 1991, pp. 48-115.

Fuad Surial Atiya, et al., An Operational Amplifier Circulator Based on the Weighted Summer, Jun. 1975.

Lee, et al., A 3V 10b 100 MS/s Digital-to-Analog Converter for Cable Modem Applications, Aug. 28-30, 2000 pp. 203-205.

Rudell, et al., "SA 18.3: A 1.9 GHz Wide-band IF Double Conversion CMOS Integrated Receiver for Cordless Telephone Applications," 1997, pp. 304-305, 476.

Young, et al., Monolithic High-Performance three-Dimensional Coil Inductors for Wireless Communications, 1997.

Wu, et al., A low glith 10-bit 75 MHz CMOS video D/A Converter, Jan. 1995, pp. 68-72.

Ivan Jorgensen, et al., "Design of a 10-bit 100 MSamples/s BiCMOS D/A Converter", 1996, pp. 730-733.

Hamasaki, et al., "A 3-V, 22-mV Multibit Current-Mode ΣΔ DAC with 100 dB Dynamic Range", Dec. 1996, pp. 1888-1894.

Tsutomu Kamoto, "An 8-bit 2-ns Monolithic DAC", Feb. 1988.

Gray et al., "Future Directions in Silicon ICs for RC Personal Communications," 1995, pp. 83-90.

Craninckx et al., "A 1.8-GHz Low-Phase-Noise CMOS VCO Using Optimized Hollow Spiral Inductors," 1997, pp. 736-744.

Craninckx et al., "A 1.8-GHz Low-Phase-Noise Voltage-Controlled Oscillator with Prescaler," 1995, pp. 1474-1482.

Liberali et al., "Progress in High-Sped and High -Resolution CMOS Data Converters", Sep. 12-14, 1995, pp. 19-28.

Sedra et al., "Micro-Electronic Circuits", 1982, pp. 95-97 and 243-247.

DP83220 CDL™ Twisted Pair FDDI Transceiver Device, Oct. 1992.

Miki et al., "An 80-MHz 8-bit CMOS D/A Converter", Dec. 1986, pp. 983-988.

Letham et al., "A high-performance CMOS 70-Mhzpalette/DAC", Dec. 1987, pp. 1041-1047.

Nakamura et al., "A 10-b 70-MS/s CMOS D/A/ converter", Apr. 1991, pp. 637-642.

Takakura et al., "A10 bit 80 MHz glitchless CMOS D/A/ converter", May 1991, pp. 26.5.1-26.5.4.

Fournier et al., "A 130-MHz 8-b CMOS video DAC for HDTV applications", Jul. 1991, pp. 1073-1077.

Reynolds, "A 320 MHz CMOS triple 8b DAC with on-chip PLL and hardware cursor", Feb. 1994, pp. 50-51.

Chin et al., "A 10-b 125 MHz CMOS digital-to-analog (DAC) with threshold-voltage compensated current sources", Nov. 1994, pp. 1374-1380.

Chan, et al., A 100 Mb/s CMOS 100Base-T3 Fast Ethernet Transceiver for Category 3, 4, & 5 UTP, 1998.

Wang, et al., A 1.2 GHz programmable DLL-Based Frequency Multiplier for Wireless Applications, Dec. 2004.

Bertolaccini, Mario, et al., A Precision Baseline Offset and Drift Corrector for Low-Frequency Applications, IEEE Transactions on Instrumentation and Measurement, vol. IM-34, No. 3, Sep. 1985, pp. 405-412.

Everitt, James, et al., "A CMOS Transceiver for 10-Mb/s and 100-Mb/s Ethernet," IEEE Journal of Solid-State Circuits, vol. 33, No. 12, Dec. 1998, pp. 2169-2177.

Song, Bang-Sup, et al., "FP 12.1: NRZ Timing Recovery Technique for Band-Limited Channels," ISSCC 96/Session 12/Serial Data Communications/Paper FP 12.1, 1996 IEEE International Solid State Circuits Conference pp. 194-196.

Mueller, K.H., "Combining Echo Cancellation and Decision Feedback Equalization," The Bell System Technical Journal, vol. 58, No. 2, Feb. 1979, pp. 491-500.

Goldberg, Lee, "Gigabit Ethernet PHY Chip Sets LAN Speed Record for CopperStory," Tech Insights, Nov. 16, 1998.

"Gigabit Ethernet 1000Base-T," Gigabit Ethernet Alliance, copyright 1997.

The Electrical Engineering Handbook, Chapter 31, "D/A and A/D Converters," Richard C. Dorf. editor, CRC Press, 1993.

H4000 Digital Ethernet Transceiver Technical Manual, Distributed Systems, Chapter 3, pp. 3-1 to 3-11, copyright 1982 by Digital Equipment Corporation.

IEEE Standards 802.3ab-2002, "Part 3: Carrier sense multiple access with collision detection (CSMA/CD) access method and physical layer specifications", pp. 147-249.

Liberali et al., "Progress in High-Speed and High -Resolution CMOS Data Converters", Sep. 12-14, 1995, pp. 19-28.

Su et al., "A CMOS Oversampling D/A Converter with a Current-Mode Semidigital Reconstruction Filter", Dec. 1993, pp. 1224-1233.

Miki et al., "An 80-MHz 8-bit CMOS D/A Converter", Dec. 1986, pp. 938-988.

Wu et al., A low glitch 10-bit 75-MHz CMOS video D/A converter, Jan. 1995, pp. 68-72.

Gray et al., Analysis and Design of Analog Integrated Circuits, 1997.

U.S. Appl. No. 09/737,743, filed Dec. 18, 2000, Sutardja.

U.S. Appl. No. 09/920,241, filed, Aug. 1, 2001, Sutardja.

* cited by examiner

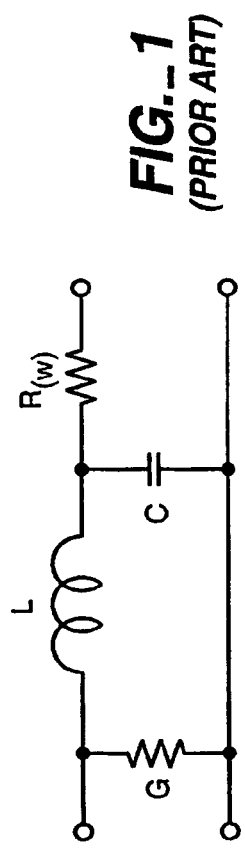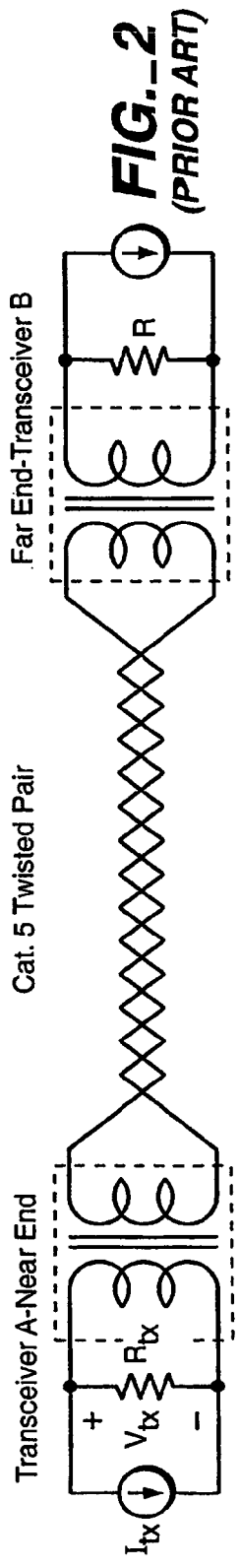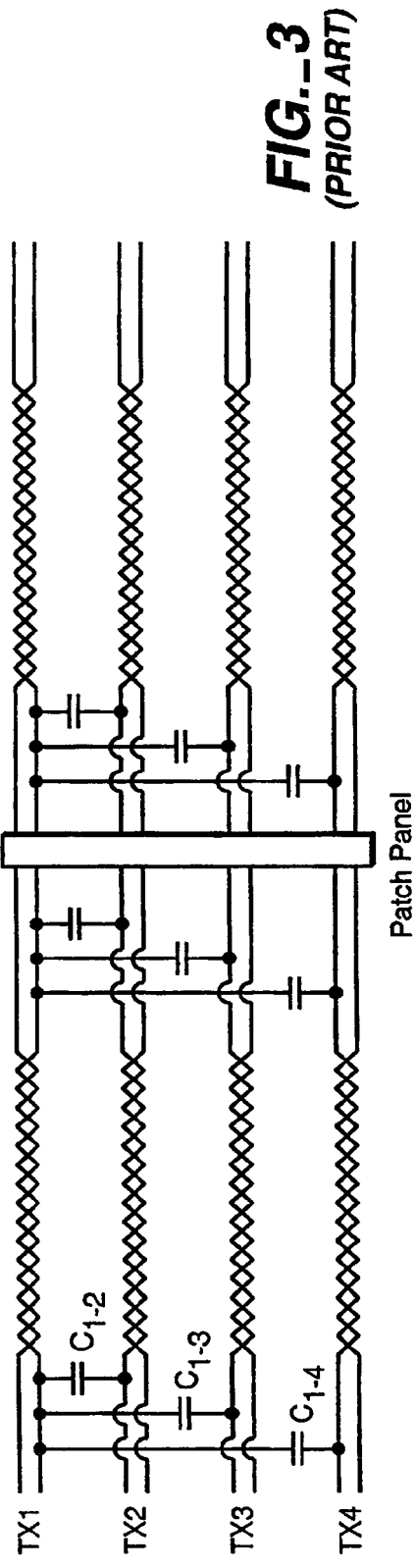
FIG._1 (PRIOR ART)
FIG._2 (PRIOR ART)
FIG._3 (PRIOR ART)

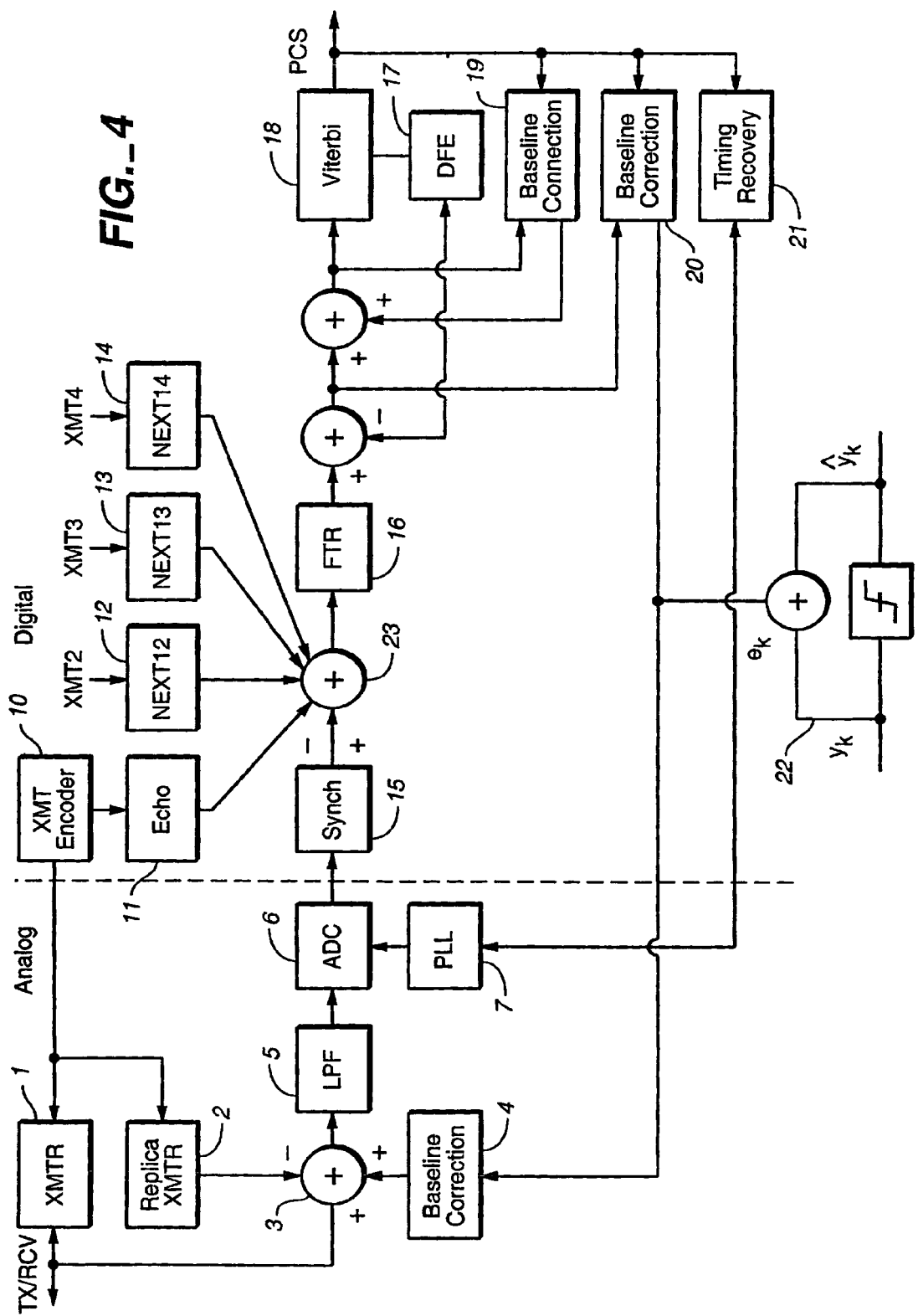
FIG._4

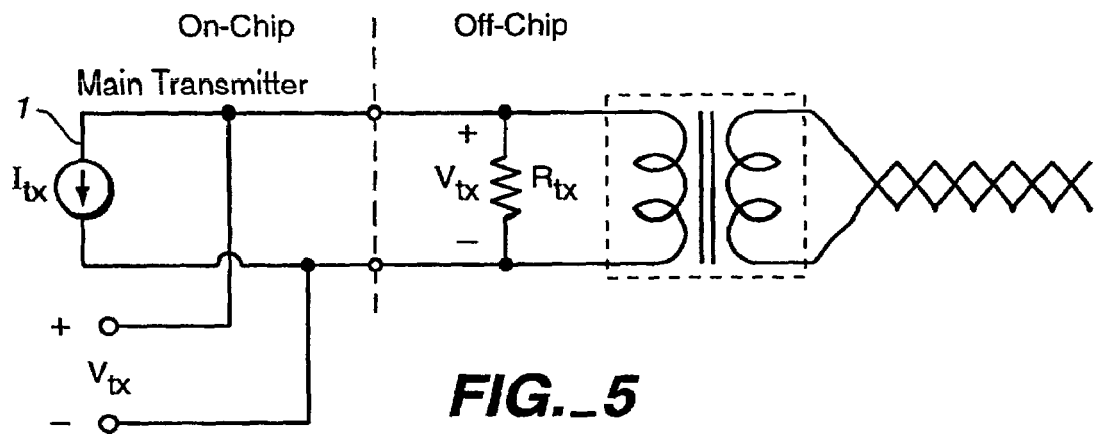
FIG._5
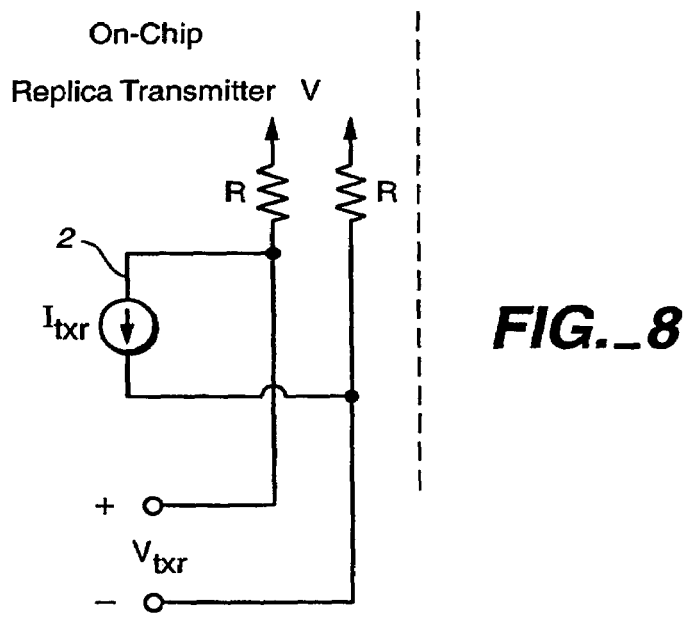
FIG._8
FIG._10

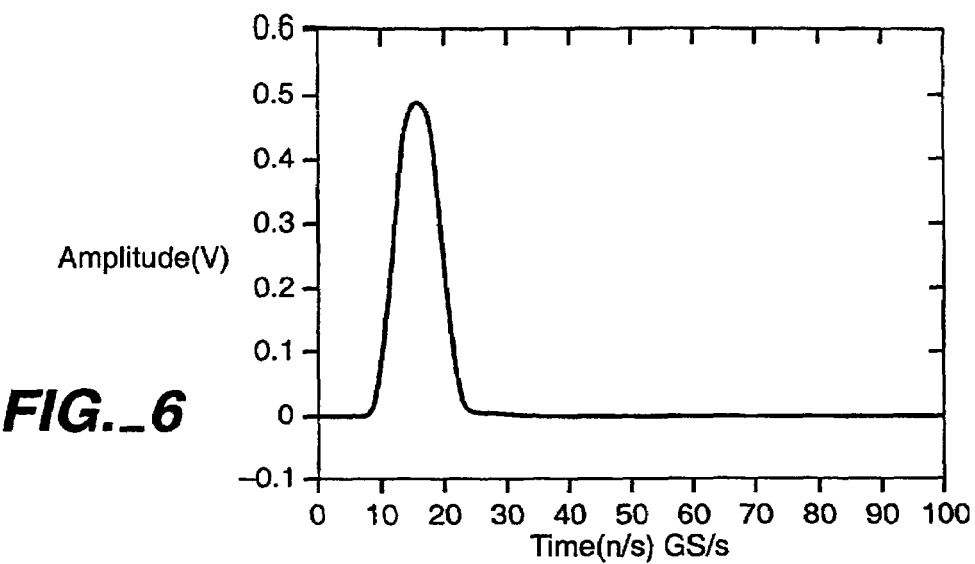
FIG._6
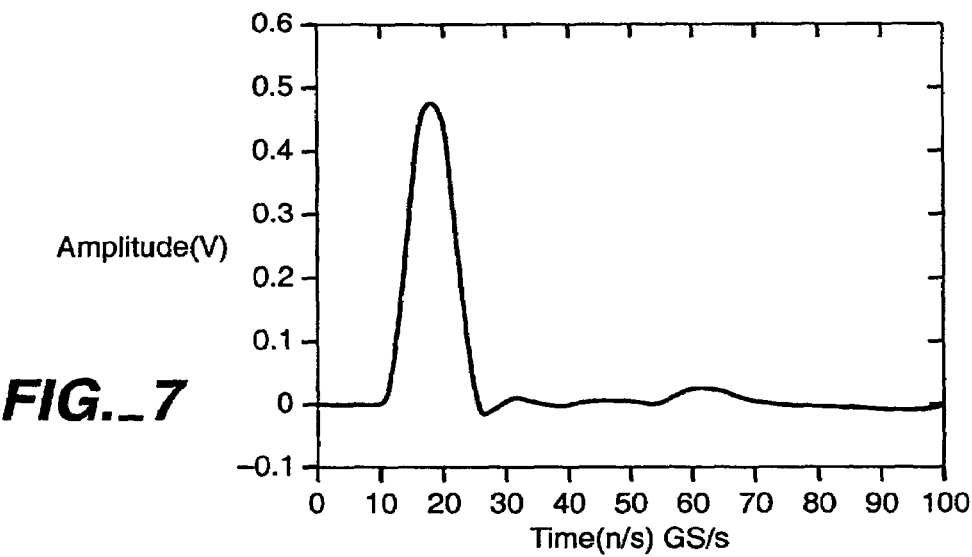
FIG._7
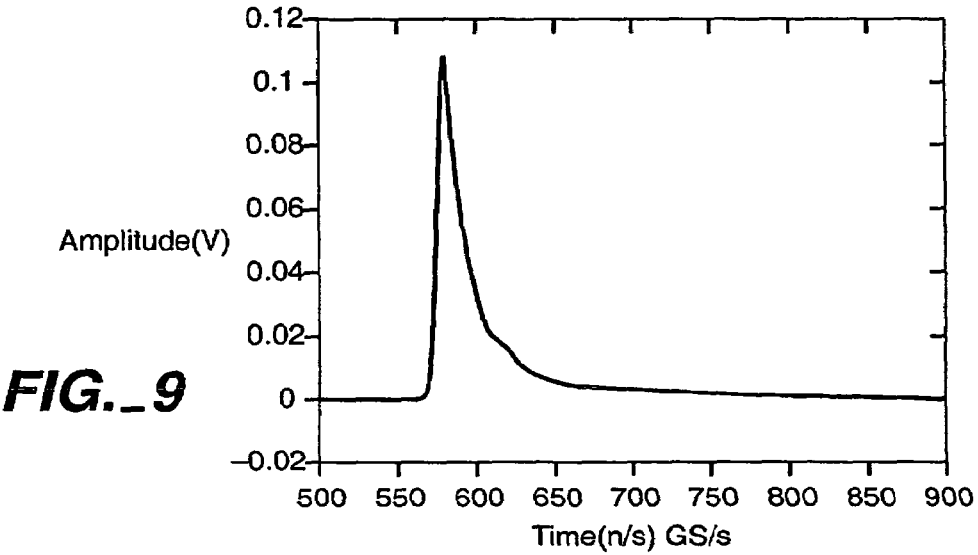
FIG._9

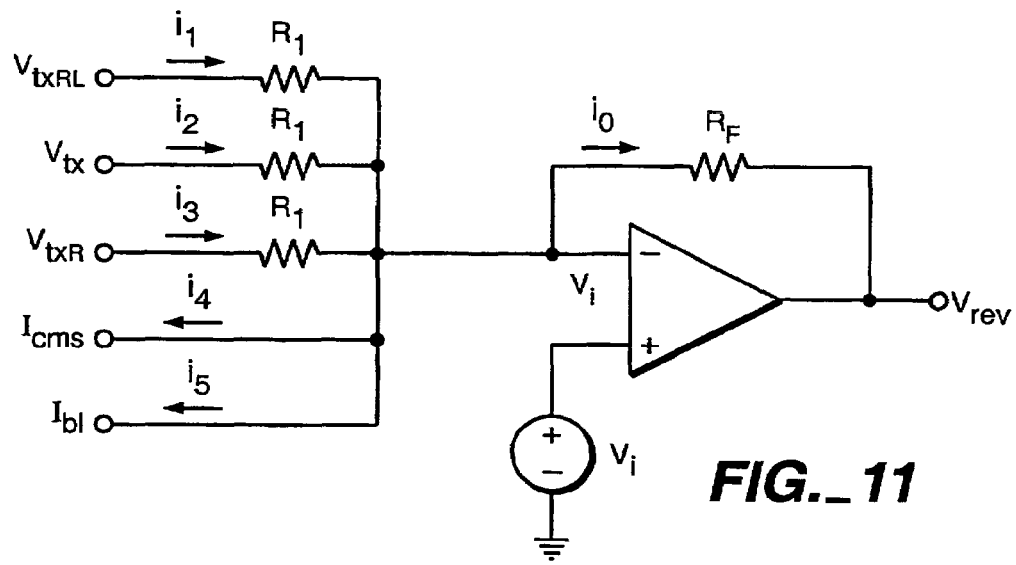
FIG._11
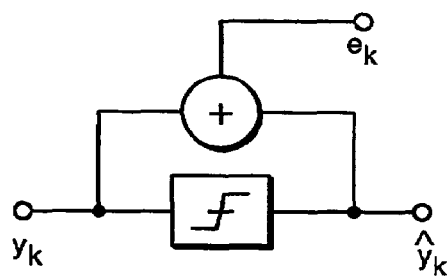
FIG._12
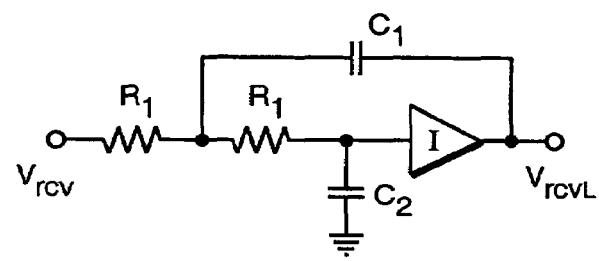
FIG._13
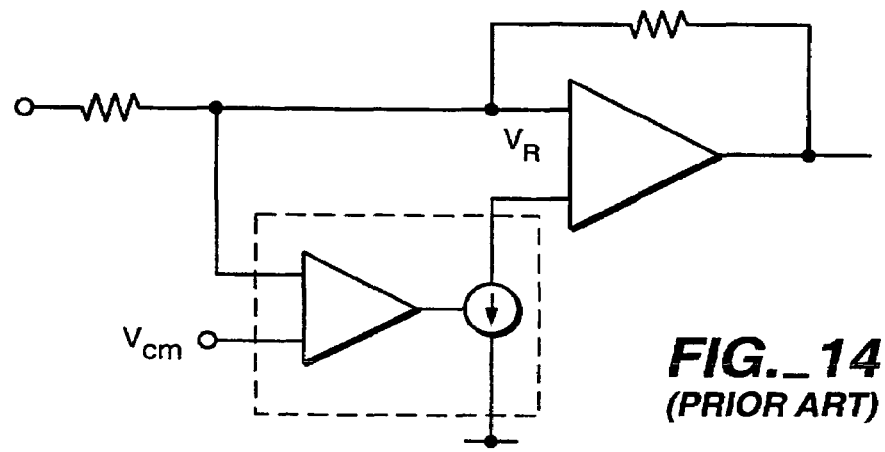
FIG._14
(PRIOR ART)

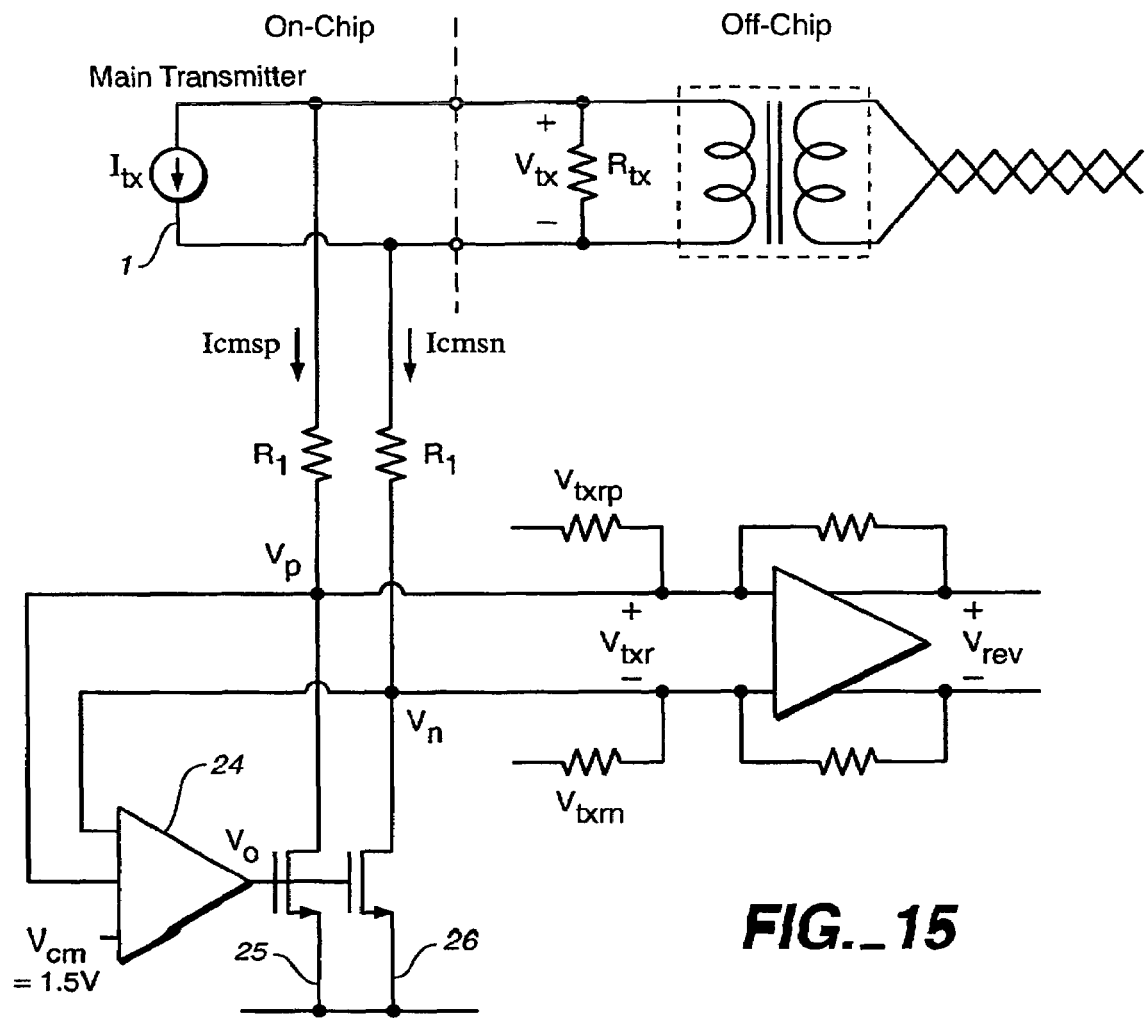
FIG._15
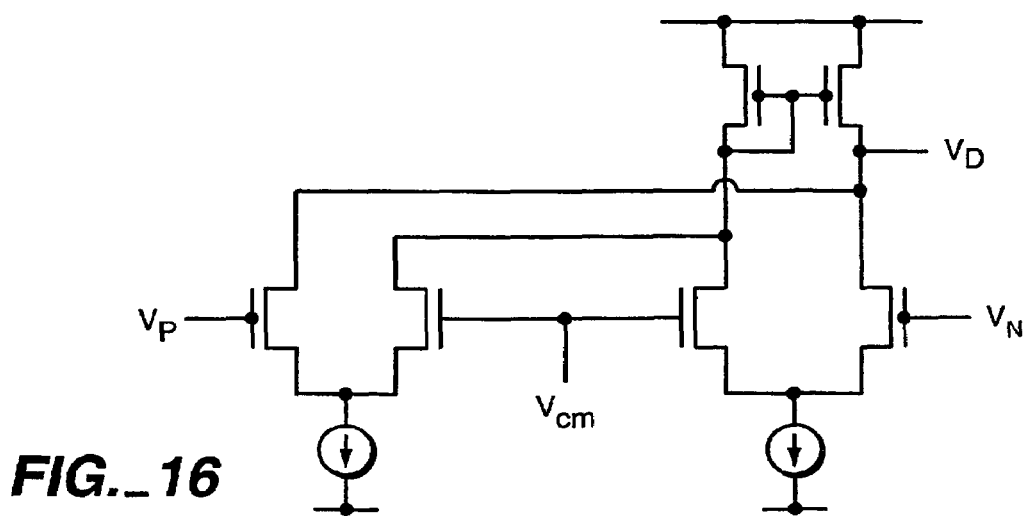
FIG._16

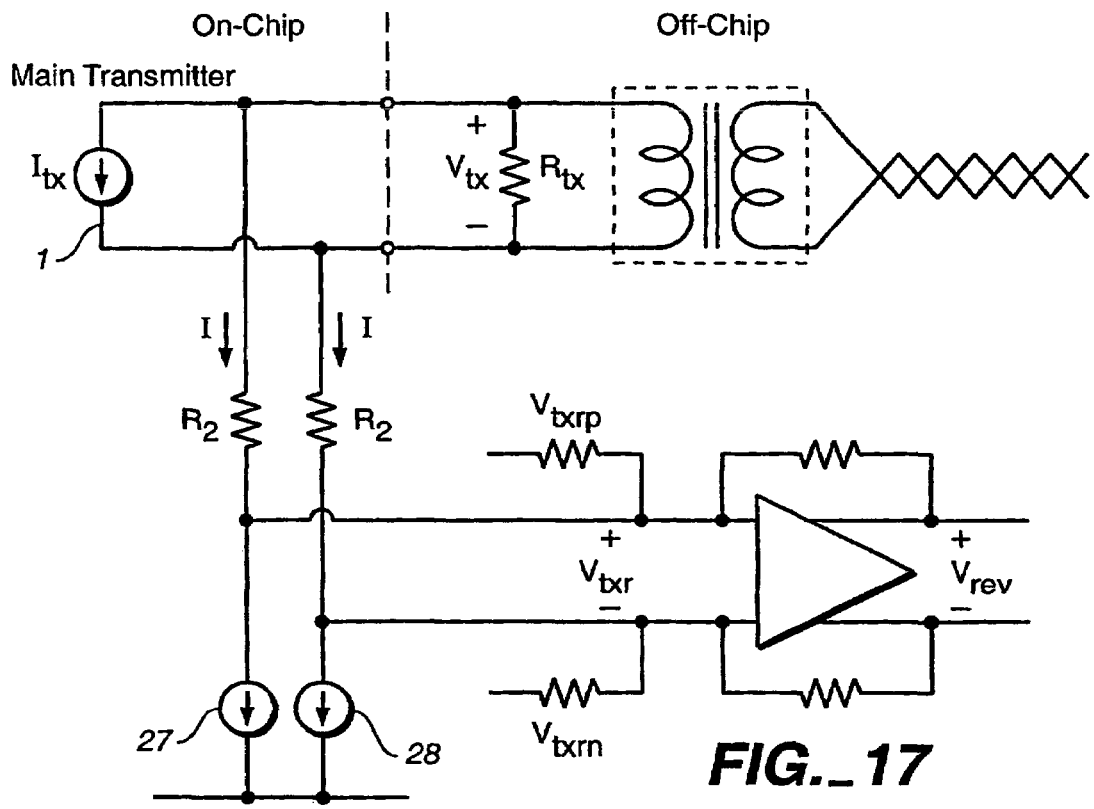
FIG._17
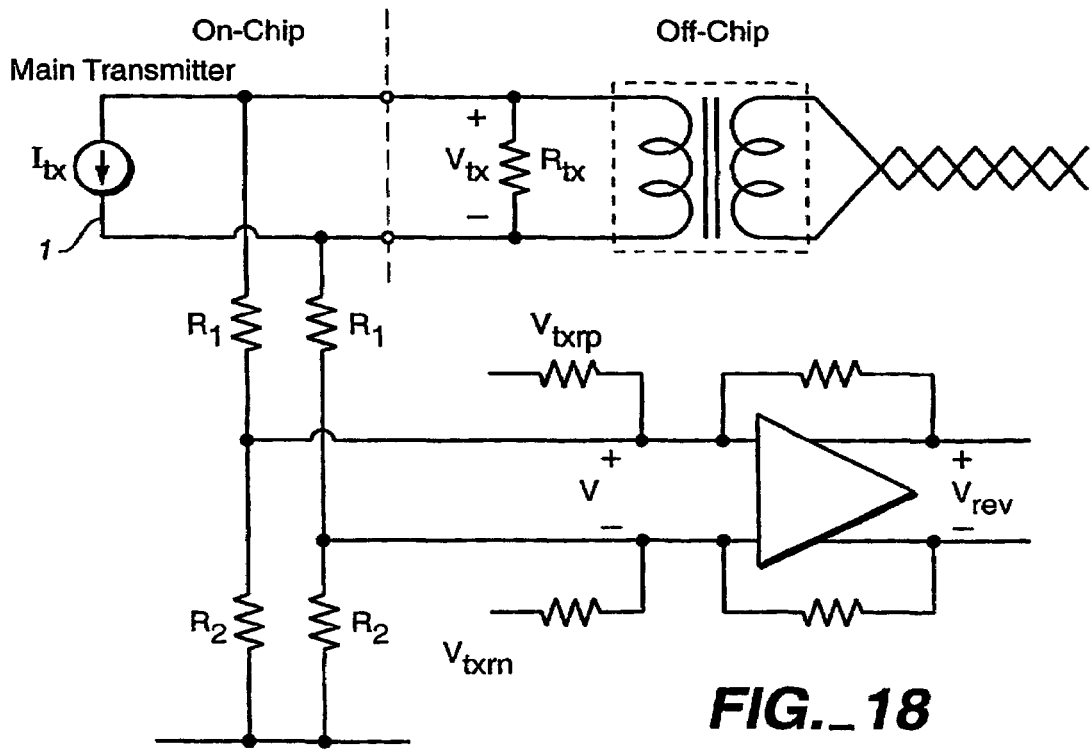
FIG._18

US 7,606,547 B1

ACTIVE RESISTANCE SUMMER FOR A TRANSFORMER HYBRID

CROSS-REFERENCE TO RELATED CASES

This application is a continuation-in-part of and claims benefit of priority of U.S. patent application Ser. No. 09/629,092, now U.S. Pat. No. 6,775,529, entitled "ACTIVE RESISTIVE SUMMER FOR A TRANSFORMER HYBRID," by the same inventors, filed Jul. 31, 2000, the disclosure of which is hereby incorporated by reference. This application is also related to U.S. patent application Ser. No. 09/920,241, now U.S. Pat. No. 7,433,665 entitled "APPARATUS AND METHOD FOR CONVERTING SINGLE-ENDED SIGNALS TO A DIFFERENTIAL SIGNAL, AND TRANSCEIVER EMPLOYING SAME," by Pierte Roo, filing date of Aug. 1, 2001, the disclosure of which is hereby incorporated by reference.

BACKGROUND OF THE INVENTION

1. Field of the Invention

The present invention relates generally to transmitting and receiving electrical signals through communication channels, such as a gigabit channel. In particular, the present invention relates to a transmit canceller that removes transmit signals from receive signals in such communication channels.

2. Background and Related Art

A gigabit channel is a communications channel with a total data throughput of one gigabit per second. A gigabit channel typically includes four (4) unshielded twisted pairs (hereinafter "UTP") of cables (e.g., category 5 cables) to achieve this data rate. IEEE Standard 802.3ab, herein incorporated by reference, specifies the physical layer parameters for a 1000BASE-T channel (e.g., a gigabit channel).

As will be appreciated by those skilled in the art, a UTP becomes a transmission line when transmitting high frequency signals. A transmission line can be modeled as a network of inductors, capacitors and resistors, as shown in FIG. 1. With reference to FIG. 1, G is normally zero and R(ω)

$$R(\omega) = k_R (1+j)\sqrt{\omega}, \quad (1)$$

where $k_R$ is a function of the conductor diameter, permeability, and conductivity. The characteristic impedance of the line is defined by:

$$Z_0 = \sqrt{\frac{R(\omega) + j\omega L}{G + j\omega C}}, \quad (2)$$

and at high frequencies, $Z_0$ becomes approximately $\sqrt{L/C}$ or approximately 100 ohms in a typical configuration. When properly terminated, a UTP of length d has a transfer function H that is a function of both length (d) and frequency (ω):

$$H(d,\omega) = e^{\gamma h(\omega)}, \quad (3)$$

where $$\gamma\omega = \sqrt{(R(\omega)+j\omega L)(G+j\omega C)}, \quad (4)$$

and substituting Equations 1 and 4 into Equation 3, and simplifying, approximately yields:

$$H(d,\omega) \approx \exp\left\{d\left[\frac{k_k}{2}\sqrt{\frac{\omega L}{C}} + j\left(\omega\sqrt{LC} + \frac{k_k}{2}\sqrt{\frac{\omega L}{C}}\right)\right]\right\}. \quad (5)$$

Equation 5 shows that attenuation and delay are a function of the cable length d.

A transmission path for a UTP typically includes a twisted pair of cables that are coupled to transformers at both a near and far end, as shown in FIG. 2. A transceiver at each end of the transmission path transmits and receives via the same twisted pair. A cable typically includes two patch cords totaling less than 10 m, and a main section of 100 m or even longer. The transmitters shown in FIG. 2 are modeled as current sources. The near end current source supplies a current $I_{tx}$. The near end transmit voltage (e.g., $I_{tx}R_{tx}$) is detected and measured across resistor $R_{tx}$. A receive signal $V_{rcv}$ (e.g., a signal transmitted from the far-end transceiver) is also detected and measured across resistor $R_{tx}$. Hence, $V_{tx}$ includes both transmit ($I_{tx}R_{tx}$) and receive ($V_{rcv}$) signals. Accordingly, the signal $V_{rcv}$ (e.g., the signal from Transceiver B) received at Transceiver A can be obtained by taking the difference between the transmit voltage and the measured voltage $V_{tx}$, as follows:

$$V_{rcv} = V_{tx} - I_{tx}R_{tx}. \quad (6)$$

Conventional solutions for removing transmit signals from receive signals often employ known transconductor ("Gm") summing stages or other current based methods. As will be appreciated, these methods often introduce signal distortion into the receive signal. Also, some transconductors have a limited signal dynamic range. Accordingly, conventional methods are often inadequate for applications requiring signal recovery. Additionally, known summing circuits, such as weighted summers using operational amplifiers, have not heretofore been modified to accommodate the intricacies associated with canceling transmit signals or regulating baseline wander (described below). A known weighted summer is discussed in Chapter 2 of "Microelectronic Circuits, Third Edition," by A. S. Sedra and K. C. Smith, 1991, incorporated herein by reference.

As will be appreciated by those skilled in the art, the receive signal $V_{rcv}$ typically contains additional components, due to baseline wander, echoes and crosstalk, for example.

Baseline wander is preferably corrected for when transmitting and receiving signals over transmission lines. Removing DC components from a receive signal using transformer coupling can cause baseline wander. As will be appreciated by those skilled in the art, baseline wander represents a deviation from an initial DC potential of a signal.

"Echoes" typically represent a residual transmit signal caused by reflections that appear in the receive signal. Echoes can cause undue interference depending on the size of the reflection.

Capacitive coupling between the channels, as shown in FIG. 3, causes crosstalk. Four channels TX1-TX4 are shown in FIG. 3. The capacitive coupling between TX1 and each of TX2, TX3 and TX4 are modeled by capacitors $C_{1-2}$, $C_{1-3}$, $C_{1-4}$, respectively. The capacitive coupling forms a high-pass filter between channels and therefore crosstalk contains mostly high frequency components. As will be appreciated by those skilled in the art, normally only the near-end crosstalk (NEXT) needs to be considered, since crosstalk is usually small and the transmission line provides further attenuation of the far-end crosstalk (FEXT).

Accordingly, there are many signal-to-noise problems to be solved in the art. Hence, an efficient transmission canceller is needed to remove a transmit signal from a receive signal without introducing excess signal distortion. An electrical circuit is also needed to subtract a transmit signal from a receive signal. There is a further need of an electrical circuit to correct baseline wander.

SUMMARY OF THE INVENTION

The present invention relates to a transmit signal canceller for use in a transformer hybrid. Such a hybrid includes a junction for transmitting and receiving signals. In the present invention, an active resistive summer can be used to cancel a transmit signal from a receive signal.

According to the invention, an electrical circuit in a communications channel is provided. The electrical circuit includes an active resistive summer having: (i) an input for a composite signal, the composite signal including a transmission signal component and a receive signal component, (ii) an input for a replica transmission signal, and (iii) an output for a receive signal which includes the composite signal minus the replica signal.

According to an another aspect of the present invention, a transmit signal canceller in a communication channel is provided. The channel includes a first transceiver for transmitting and receiving signals and a replica transmitter for generating a replica transmission signal input. A composite signal at a near end includes a transmission signal of the first transceiver and a received signal of a second transceiver. The transmit canceller includes: (i) an operational amplifier having a positive input terminal, a negative input terminal, and an output terminal; (ii) a feedback element in communication with the negative input terminal and the output terminal; (iii) a first input resistor in communication with the negative input terminal and the measured signal input; (iv) a second input resistor in communication with the negative input terminal and the replica signal input; and (v) a predetermined voltage source in communication with the positive terminal of the operational amplifier. The receive signal is an output at the output terminal of the operational amplifier.

According to still another aspect of the present invention, a communication system including a first transmission channel with a first end and a second end is provided. The first end couples to a first transformer and the second end couples to a second transformer. A first transceiver transmits and receives signals via the first transformer and a second transceiver transmits and receives signals via the second transformer. A first signal is supplied at the near end. The first signal includes a transmission signal component of the first transceiver and a receive signal component of the second transceiver. The communications system includes: (i) a replica transmitter that generates a replica of the transmission signal component of the first transceiver; (ii) a filter to filter the replica signal; (iii) an active resistive summer receiving the first signal, and the filtered replica signal as inputs to reduce the transmission signal component at an output of the active resistive summer.

According to still another aspect of the present invention, a method of correcting baseline wander in a receive signal in a communications channel having a near and far end is provided. The channel includes a first transceiver at the near end and a second transceiver at the far end, each to transmit and receive signals. The method includes the steps of: (i) providing a composite signal, the composite signal including a transmission signal of the first transceiver and a receive signal of the second transceiver; (ii) generating a replica of the transmission signal; (iii) subtracting the replica signal from the composite signal through an active resistive summer; and (iv) providing a baseline correction current into the active resistive summer.

According to still another aspect of the present invention, an electrical circuit in a communications system is provided. A composite signal including a transmission signal component and a receive signal component, a replica transmission signal and a common-mode shift current are provided. Further circuitry is provided to control the magnitude of the common-mode shift current so that the magnitude of the composite signal does not exceed a predetermined value of an operating parameter of the electrical circuit.

In still another aspect of the present invention, an electrical circuit in a communications system is provided. An active resistive summing circuit produces a receive signal as a difference between a composite signal and a replica transmission signal, the composite signal comprising a transmission signal component and a receive signal component. Further circuitry is provided which controls the magnitude of the composite signal.

In still another aspect of the present invention, another electrical circuit in a communications system is provided. An active resistive summer is provided that receives a composite signal that includes a transmission signal component and a receive signal component, a replica transmission signal, and a common-mode shift current signal. The active resistive summer provides an output which is a receive signal that comprises the composite signal minus the replica signal. Further circuitry is provided which controls the magnitude of the common-mode shift current to thereby control the magnitude of the composite signal.

These and other objects, features, and advantages of the present invention will be apparent from the following description of the preferred embodiments of the present invention.

BRIEF DESCRIPTION OF THE DRAWINGS

The details of the present invention will be more readily understood from a detailed description of the preferred embodiments taken in conjunction with the following figures.

FIG. 1 is a circuit diagram illustrating a transmission line model.

FIG. 2 is a circuit diagram illustrating a transmission path across a twisted pair of cables, the cables being coupled to transformers at each end.

FIG. 3 is a diagram-illustrating crosstalk between channels in a gigabit channel.

FIG. 4 is a block diagram illustrating a system overview of a communications channel.

FIG. 5 is a circuit diagram illustrating a transmitter.

FIG. 6 is a graph illustrating a transmit signal.

FIG. 7 is a graph illustrating a composite signal with echoes.

FIG. 8 is a circuit diagram illustrating a replica transmitter.

FIG. 9 is a graph illustrating a receive signal.

FIG. 10 is a block diagram illustrating a low-pass filter.

FIG. 11 is a circuit diagram illustrating an active resistive summer.

FIG. 12 is a circuit diagram illustrating an error detection circuit.

FIG. 13 is a circuit diagram illustrating a low-pass filter.

FIG. 14 is a circuit diagram illustrating a conventional voltage controlled current source.

FIG. 15 is a circuit diagram illustrating one exemplary embodiment of a common-mode feedback circuit coupled with a transmitter.

FIG. 16 is a circuit diagram illustrating one exemplary implementation of an operational amplifier utilized in the common-mode feedback circuit.

FIG. 17 is a circuit diagram illustrating one exemplary embodiment of a common-mode shift current control circuit coupled with a transmitter.

FIG. 18 is a circuit diagram illustrating one exemplary embodiment of a common-mode shift control circuit coupled with a transmitter.

DETAILED DESCRIPTION OF THE PRESENTLY PREFERRED EMBODIMENTS

The preferred embodiments will be described with respect to a gigabit channel, as used, for example, in an Ethernet network; and to electrical circuits associated with separating transmit and receive signals in such a gigabit channel. The preferred embodiments will also be described with respect to baseline wander correction in such a gigabit channel. However, as will be appreciated by those skilled in the art, the present invention is also applicable to other transmission channels, and to other electrical circuits having applications requiring cancellation of transmit signals, for example.

FIG. 4 is a block diagram illustrating principle components for one of the four channels in a preferred gigabit channel configuration for use in an Ethernet network. As illustrated in FIG. 4, a vertical dashed line divides analog and digital processing components. The analog components preferably include a transmitter ("XMTR") 1, replica transmitter ("Replica XMTR") 2, transmit canceller 3, baseline correction module 4, low pass filter ("LPF") 5, analog-to-digital converter ("ADC") 6, and phase-lock loop ("PLL") 7. A known PLL can be used with the present invention.

Digital processing components preferably include a transmitter encoder 10, echo module 11, NEXT cancellers 12-14 to assist in removing echoes, synchronization module 15, FIR (Finite Impulse Response) equalizer 16 and a DFE (Decision Feedback Equalizer) 17 to equalize a receive signal, and a Viterbi module 18. The digital processing components also include baseline correction modules 19 and 20 to correct residual baseline wander. A timing recovery module 21, an error correction detector 22 (described in further detail below), and summing junction 23 are also shown. The individual digital components designated by blocks in FIG. 4 are all well known in the communication arts, and their specific construction and operation are not critical to the operation or best mode for carrying out the present invention.

The analog "front-end" components shown in FIG. 4 will now be described in even further detail. The front-end analog components are preferably designed and constructed via customized integrated circuits. However, as will be appreciated by those skilled in the art, the inventive circuits and corresponding configuration could also be realized using discrete components as well.

As illustrated in FIG. 5, transmitter 1 preferably includes a current-source $I_{tx}$ that generates a transmit signal over a resistor $R_{tx}$. An appropriate value for resistor $R_{tx}$ can be selected to match the line impedance, for example. In one preferred embodiment, a resistor center tap is set to 2.5 volts so the transmitter 1 effectively sees a differential impedance of 25 ohms. Preferred performance specifications for the transmitter 1 are further detailed in Table 1, below.

An impulse transmit signal can be generated from a unit square pulse of 1 T width filtered by a one-pole, low-pass filter (not shown) with a cutoff frequency between 85 MHz and 125 MHz. Slew-rate control can also be used to limit the rise and fall times and thus reduce the high frequency components of a transmit signal. Of course, any transmit signal preferably fits into the transmit template provided by the IEEE 802.3ab Standard. An ideal transmit pulse is shown in FIG. 6.

A measured voltage $V_{tx}$ across $R_{tx}$ (FIG. 5) is shown in FIG. 7. The measured signal $V_{tx}$ contains interference caused by line reflections (e.g., echoes). The reflections are caused by impedance discontinuity due to impedance mismatch between different cables. For example, a large reflection pulse at 60 ns as shown in FIG. 7 corresponds to a reflection from the impedance discontinuity at an adapter connecting a 5 m patch cord to a 100 m cable. The magnitude of the echoes can be significant when compared to the magnitude of the receive signal at a long line length, and therefore, echo cancellation, as provided by the NEXT cancellers 12-14 shown in FIG. 4, is employed.

A receive signal $V_{rcv}$ (e.g., a signal received from a far-end transceiver) is also measured across resistor $R_{tx}$, as shown in FIG. 5. Accordingly, the near end transmit signal ($I_{tx}R_{tx}$) is preferably canceled or reduced from the composite signal $V_{tx}$ in order to effectively recover the far-end received signal $V_{rcv}$. This type of active cancellation can be accomplished with a replica transmit signal $V_{txf}$. Accordingly, a replica transmitter 2 (to be described below) is provided to generate a signal $V_{txr}$ to be subtracted from the measured signal $V_{tx}$, thus, effectively reducing the transmit signal ($I_{tx}R_{tx}$).

A receive signal x(t) transmitted with pulse amplitude modulation ("PAM") is define by:

$$x(t) = \sum_{n=1}^{5} a_n p(i - nT), \quad (7)$$

where $a_n$ is the transmit symbols and p(t) is the channel pulse derived by convoluting an impulse transmit pulse with a channel response defined by Equation 5. The receive signal for a 100 m cable is heavily attenuated by the transmission line and the pulse width is dispersed, as shown in FIG. 9. A 100 m UTP delays the signal by about 550 ns. Signal equalization preferably uses high frequency boosting via the FIR 16 to remove precursor intersymbol interference ("ISI") and to insert a zero crossing for timing recovery 21. The DFE 17 is used to remove postcursor ISI.

The receive signal's elongated tail results from transformer coupling (e.g., a high-pass filter) with a time constant (e.g., L/R) typically on the order of micro-seconds. Since the receive signal contains little or no average DC energy, the negative tail has the same amount of energy as the positive pulse. In this regard, the signal's area integral is zero. In a typical example, a tail can last over 10 μs with a magnitude of no more than 0.5 mV. The long tail causes any DC bias to drift back toward zero, which can lead to baseline wander. As will be appreciated, this response time is too long to be practically removed by a digital equalizer, but the response is slow enough to be cancelled using a slow integrator, for example. The baseline wander canceller 4 is preferably decision directed to minimize the error defined by the difference between the equalized value and it's sliced value, as discussed below.

As illustrated in FIG. 8, the replica transmitter 2 includes a current source $I_{txr}$. $I_{txr}$ is coupled to a voltage V through resistors R, as shown in FIG. 8. In a preferred embodiment, R is 100 ohms and V is about 2.5 volts. The replica signal $V_{txr}$ is preferably filtered through a known low-pass filter to obtain a low-pass replica signal ("$V_{txrl}$"), as shown in FIG. 10. Replica signal $V_{txr}$ can also be inverted in a known manner to produce $-V_{txr}$. The preferred performance specifications for the transmitter 1 and replica transmitter 2 are shown in Table 1.

TABLE 1

Transmitter and Replica Performance Specifications

| Parameters | Specifications |
| --- | --- |
| Transmit Current | +/−40 mA |
| Replica Transmit Current | ¼ of transmit current |
| Number of levels | 16 (not including 0) |
| Number of sub-units | 8 (sequentially delayed) |
| Transmit Profile | [1 1 2 2 1 1], w/~1 ns delay |
| Replica Transmit Profile | [1 1 3 3], w/~1 ns delay |
| $R_{tx}$ | 100Ω |

A transmit signal canceller 4 is illustrated in FIG. 11. The transmit canceller 4 removes the transmission signal ($I_{tx}R_{tx}$) from the measured (or detected) transmit $V_{tx}$ signal. In particular, the transmit canceller includes an active resistive summer that provides a large input dynamic range and stable linearity characteristics, while removing (e.g., reducing or canceling) the unwanted transmit signal component.

As illustrated in FIG. 11, the active summer includes an operational amplifier ("op-amp") with inverting feedback. The op-amp is preferably constructed using integrated circuits in a known manner. The summer receives $V_{txrl}$, $V_{tx}$, $-V_{txr}$, $I_{cms}$, and $I_{bl}$ as input signals. $I_{bl}$ is a baseline wander control current, and $I_{cms}$ is a common-mode shift current, each as further discussed below.

As will be appreciated by those skilled in the art, a transformer typically has high-pass characteristics. Accordingly, replica signal $-V_{txr}$ is combined (e.g., subtracted via the active resistive summer) with the low pass replica signal $V_{txrl}$ to produce a high-pass replica signal. As an alternative configuration, $V_{txr}$ could be filtered through a known high-pass filter prior to the transmit canceller 3 stage.

Returning to FIG. 11, receive signal $V_{rcv}$ is determined from the following relationships.
Let:
Vi=voltage for the op-amp's positive terminal;
$V_1 = V_{txrl}$;
$V_2 = V_{tx}$;
$-V_3 = -V_{txr}$;
$i_4 = I_{cms}$; and
$i_5 = I_{bl}$.
Then:

$$i_1 + i_2 - i_3 - i_4 - i_5 = i_0;\text{ and}$$

$$\frac{V_1 - Vi}{R_1} = i_1;\ \frac{V_1 - Vi}{R_1} = i_2;\ \frac{Vi - -V_1}{R_1} = i_3;\ \frac{Vi - Vrcv}{R_F} = i_0. \quad (8)$$

$$\frac{V_1 - Vi}{R_1} + \frac{V_1 - Vi}{R_1} - \frac{Vi + V_3}{R_1} - i_4 - i_5 = \frac{Vi - Vrcv}{R_F}$$

$$\frac{V_1 + V_2 - V_3 3Vi}{R_1} - i_1 - i_5 = \frac{Vi - Vrcv}{R_r}$$

$$\frac{R_r}{R_1}(V_1 + V_2 - V_3 - 3Vi) - i_4 \cdot R_r - i_3 \cdot R_F = Vi - Vrcv$$

$$\frac{R_F}{R_1}(V_1 + V_2 - V_3 - 3vi) - R_r i_4 - R_r i, -Vi = -Vrcv$$

$$V_{rcv} = V_1 - \frac{R_r}{R_1}(V_1 + V_2 - V_3 - 3Vi) + R_r(i_1 + i_3)$$

Substituting the input signals for their placeholders yields the definition for $V_{rcv}$, as follows:

$$V_{rcv} = Vi - \frac{R_F}{R_1}(Vtxrl + Vtx - Vtxr - 3Vi) + R_r(Icms + Ibl). \quad (9)$$

The gain is preferably set between 0.75 and 1 (e.g., $R_F/R_1$ equals 0.75 to 1). For a small signal analysis, Vi can be set to zero (0). Also, as will be appreciated by those skilled in the art, in a fully differential circuit, Vi effectively drops out of the equations since $V_{rcv} = V_{rcv}^{(+)} - V_{rcv}^{(-)}$. As discussed, $V_{txrl}$ and $-V_{txr}$ are combined through the active summer to provide a high-pass replica signal ("$V_{txrh}$"). The receive signal $V_{rcv}$ can then be recovered as shown by Equation 9.

Preferred transmit canceller specifications are detailed in Table 2, below.

TABLE 2

Transmit Canceller Performance Specifications

| Parameters | Specifications |
| --- | --- |
| Input Dynamic Range | +/−2.5 V(diff.) for transmit signal |
| Output Dynamic Range | +/−1 V(diff.) |
| Input impedance | High, ~10 k. |
| Output impedance | Low |
| Cutoff frequency | Greater than 31.5 Mhz |
| DC Gain | 0.85 -dependent of the LPF 5 and ADC 6 characteristics (FIG. 4) |
| Power | 25 mw, including LPF 5 (FIG. 4) |
| $R_f$ | 8.5 KΩ; or 7.5 KΩ for increased attenuation |
| Vi | 2.0 volts |
| $R_1$ | 10 KΩ |

A known current mode circuit, e.g., a voltage controlled current source (VCCS) as shown in FIG. 14, with feedback preferably sets the summer input current-mode voltage ($V_{cm}$). Of course, other known current mode circuits could be employed with the present invention. This current-mode circuit shifts the common-mode of both the transmit and replica transmit signals. The input to the op amp ($V_{aip}$, $V_{ain}$) is compared against the desired op amp output common-mode voltage ($V_d$):

$$V_d = (V_{aip} - V_{cm}) + (V_{ain} - V_{cm}). \quad (10)$$

Then, the common-mode shift current can be determined from:

$$I_{cms} = V_d g_m + I_o, \quad (11)$$

where $g_m$ is a transconductance and $I_o$ is an offset current. An appropriate transconductance and offset current can be selected by setting $V_{cm} = I_{cms}R_F = V_d g_m R_F + I_o R_F$, to ensure a proper common-mode voltage seen by the op amp inputs. In this manner, the common mode shift current $I_{cms}$ can be regulated to pull down the common mode voltage of the operational amplifier as needed.

Baseline wander current $I_{bl}$ is also "summed" by the active resistive summer, as shown in FIG. 11, to correct baseline wander. Approximately ninety percent (90%) of all system baseline correction can be obtained through the active summer. The remaining baseline residual can be digitally corrected through an equalizer, for example. As will be appreciated, the FIG. 11 topology allows the current sources ($I_{bl}$ and $I_{cms}$) to each have a fixed output voltage, thus, minimizing current deviation due to finite output resistance.

The baseline wander correction module 4 preferably corrects for baseline wander using a decision-directed method, such as a discrete integrator. The decision-directed method can be implemented with a known charge pump, where the pump sign (e.g., +1/−1) is determined digitally using an error between the equalized baseline signal ($y_k$) and a sliced baseline signal ($y^+_k$), as shown in FIG. 12. As will be appreciated by those skilled in the art, the expected error value (e.g., $E[e_k]$) is ideally driven to zero. The charge pump is preferably pumped up or down based on the error value. For example, a positive error implies that a negative value should be input into the charge pump. For a negative error, a positive value should be input into the charge pump. The charge pump preferably has at least two current settings to regulate $I_{bl}$. Of course, a charge pump with many current settings could be used to obtain finer baseline correction control.

The preferred baseline wander correction performance specifications are further detailed in Table 3, below.

TABLE 3

Baseline Wander Correction Specification

| Parameters | Specifications |
| --- | --- |
| Output Dynamic Range | +/−100 uA (diff.), (+/−1 V/$R_1$, $R_1$ = 10 kΩ) |
| Output impedance | High |
| Integration Factors | 2 mV/T, 4 mV/T |
| Bandwidth | >100 MHz |

A second-order low-pass filter, as shown in FIG. 13, is cascaded after the summer to preferably flatten the frequency response out to about 31.25 MHz (<1 dB). A minimum overall attenuation of 20 dB at 125 MHz is desirable for the low pass filter. In a sampled system, some aliasing beyond Nyquist frequency (or excess bandwidth) is acceptable, but minimum aliasing is allowed at the sampling frequency. The transmitted data is preferably band-limited to the Nyquist rate.

Preferred performance characteristics of the low pass filter 5 are further detailed in Table 4, below.

TABLE 4

LPF Performance Specification

| Parameters | Specifications |
| --- | --- |
| Input Dynamic Range | +/−1 V (diff.) |
| Output Dynamic Range | +/−1 V (diff.) |
| Input impedance | High, ~10 k. |
| Output impedance | Low |
| Cutoff frequency | 50-60 Mhz. |
| Q (2nd order) | ~1 |
| Input impedance | High, ~10 k. |
| Output impedance | Low, <100 |
| DC gain | 1 |

As an alternative arrangement, a third-order Sallen and Key low pass filter as disclosed in a co-pending application by the same inventor of this application, titled "CALIBRATION CIRCUIT," filed concurrently herewith, and hereby incorporated by reference, could be used as filter 5. Similarly, the calibration circuit disclosed therein could also be used to calibrate the low pass filter 5.

Analog-to-digital converters are well know in the art. As will be appreciated, the ADC 6 resolution is often determined by system digital processing requirements. In a preferred embodiment, the Viterbi detector 18 requires an effective 7-bit resolution. Residual baseline wander, echoes, and crosstalk increase the dynamic range by about 200-300 mV, which increases the required resolution. The reduction in dynamic range due to insertion loss for a 100 m cable is approximately 40%. Accordingly, an 8-bit resolution is preferred.

The preferred ADC performance specifications are further detailed in Table 5, below.

TABLE 5

ADC Performance Specification

| Parameters | Specifications |
| --- | --- |
| Resolution | 8-bits minimum. |
| Sampling frequency | 8 MHz (125 MS) |
| Source Output Impedance | Low, ~200-400Ω |

As previously discussed, the transmitter 1 preferably includes a current-source $I_{tx}$ that a resistor $R_{tx}$ to generate a transmit signal voltage equal to $I_{tx}R_{tx}$. In one preferred embodiment, a center tap of a transformer is connected to a 2.5 volt supply voltage. If the transmitter 1, for example, transmitting 1 volt or receiving 1 volt, then the possible swing in voltage across resistor $R_{tx}$ is 2 volts. More specifically, the voltage across resistor $R_{tx}$ can vary between 1.5 volts and 3.5 volts. If the power supply voltage source for the circuit is less than the maximum voltage that could be present across resistor $R_{tx}$, then improper operation or damage can result. It is therefore preferable to provide common-mode shift current control circuitry which will control the amount of current being drawn across resistor $R_{tx}$ so as to keep the composite voltage signal within an appropriate operating range.

One embodiment of the present invention is depicted in FIG. 15. Common-mode shift current control circuitry is illustrated as common-mode feedback circuitry including an operational amplifier 24 and a pair of field effect transistors (FETs) 25 and 26. The operational amplifier 24 includes a first input terminal, a second input terminal, and an output. The operational amplifier 24 receives a differential voltage signal at the first input terminal, wherein the differential voltage signal is a composite signal which includes components related to the voltage transmitted across the transformer as well as the voltage received across the transformer. A common-mode voltage signal $V_{CM}$ is received at the second input terminal. In the embodiment depicted in FIG. 15, $V_{CM}$=1.5 volts. The output of the operational amplifier 24 is a common-mode shift current control signal, $V_D$.

As will be appreciated by those skilled in the art, when the voltage applied at the first input terminal is different from the voltage applied at the second input terminal, the operational amplifier 24 will sense the inequality. Referring to FIG. 16, the internal operation of the operational amplifier 24 is shown. When the current $I_n$ is greater than the current $I_p$, the voltages $V_p$ and $V_n$ will not be in balance around $V_{CM}$. As a result of such an imbalance, $V_D$ will increase. Alternatively, when the current $I_p$ is greater than the current $I_n$, the voltages $V_p$ and $V_n$ will also not be in balance around $V_{CM}$. As a result of such an imbalance, $V_D$ will decrease.

Referring again to FIG. 15, the effects of increasing or decreasing $V_D$ are described. By controlling $V_D$, the common-mode shift current flowing through the resistors $R_1$ can be controlled. By controlling the common-mode shift current, $V_{tx}$ is thereby also controlled. By being able to control $T_{tx}$, the situation in which $V_{tx}$ exceeds an operating parameter of the circuit, such as the power supply voltage source, is avoided. Specifically, it is undesirable for the composite voltage signal to exceed the supplied voltage for the circuit. Using the common-mode feedback arrangement depicted in the embodiment of FIG. 15, $V_{tx}$ is controlled in relation to the common-mode voltage signal.

$$I_p = I_n \quad (13)$$

$$V_p = V_{txp} - I_p R_1 \quad (14)$$

$$V_n = V_{txp} - I_n R_1 \quad (15)$$

Referring to Equation 13, it should be appreciated that when the common-mode shift currents $I_p$ and $I_n$ are equal, then the voltage drop that occurs over the resistor $R_1$ is the same for both components of the composite differential signal. See Equations 14 and 15. The differential signal applied to the input of the operational amplifier is therefore of the same magnitude as the differential composite signal.

It should be appreciated that the common-mode feedback circuit of FIG. 15 should work regardless of the resistor value chosen, for example $2R_1$. Because the current drop across the resistors will be the same in both components of the differential signal, the differential voltage signal applied to the input of the active resistive summer will be of the same magnitude as the composite voltage signal. The distinction relates to the output of the summer, and not to the operation or effectiveness of the common-mode shift current control circuitry.

In another embodiment of the present invention, a constant current source is provided to generate the common-mode shift current control. Referring to FIG. 17, constant current sources 27 and 28 are depicted as controlling the common-mode shift currents $I_p$ and $I_n$.

$$V_{tx2} = V_{tx} - IR_2 \quad (16)$$

Because $I_p$ and $I_n$ are equal, the magnitude of the differential signal applied to the active resistive summer is therefore shown in Equation 16. As compared with the embodiment in which the common-mode feedback circuit is utilized to control the magnitude of the common-mode shift current, and therefore the magnitude of the composite signal relative to the applied common-mode voltage, in the embodiment utilizing constant current sources, the voltage drop between the composite differential signal and the differential signal applied to the summer will be constant, i.e. $IR_2$.

In another embodiment of the present invention, the common-mode shift current control circuitry includes a resistor divider. Through the use of a resistor divider, the voltage signal applied to the summer is a proportionately reduced signal as compared with the composite voltage signal.

$$V_{tx3} = V_{tx} R_2 / (R_1 + R_2)$$

It should be appreciated by those skilled in the art that, by selecting appropriate values for resistors $R_1$ and $R_2$, the magnitude of the common-mode shift current and the composite signal can be controlled so that the magnitude of the composite signal does not exceed an operating parameter of the communications circuit, such as the power supply voltage source.

Thus, a transmit canceller including an active resistive summer has been described. Such an active resistive summer has not heretofore been developed for applications such as canceling signals in gigabit channels. Correcting baseline wander through such an active resistive summer has also been described herein. Controlling common-mode shift current has also been described herein.

While the present invention has been described with respect to what is presently considered to be the preferred embodiments, it will be understood that the invention is not limited to the disclosed embodiments. To the contrary, the invention covers various modifications and equivalent arrangements included within the spirit and scope of the appended claims. The scope of the following claims is to be accorded the broadest interpretation so as to encompass all such modifications and equivalent structures and functions.

For example, while preferred circuit configurations and component values have been described, it will be understood that modifications could be made without deviating from the inventive structures. For example, values for the feedback and input resistors $R_f$ and $R_i$ could be changed to obtain higher or lower gains. Also, an active resistive summer could be constructed to sum only the measured signal $V_{tx}$ and the replica signal $V_{txr}$ (or a high-pass version of the replica), for example. Additionally, while the communication channel has been described with respect to a twisted pair of cables, the invention may also be practiced with other communication channels such as optical and wireless channels. Moreover, this invention should not be limited to gigabit transmission rates and can be practiced at any transmission rate requiring the signal processing characteristics of the invention. Of course, these and other such modifications are covered by the present invention.

What is claimed is:

1. An electrical circuit in a communications channel, comprising:
   a first sub-circuit having a first input which receives a composite signal that includes a transmission signal component and a receive signal component, a second input which receives a replica transmission signal, a third input which receives an analog baseline correction current, and an output which provides a receive signal which comprises the composite signal minus the replica signal; and
   a second sub-circuit for controlling the analog baseline correction current, so that the magnitude of the composite signal does not exceed a predetermined value of an operating parameter of the electrical circuit,
   wherein the composite signal, the replica transmission signal, and the analog baseline correction current are directly connected together at a common node of the first sub-circuit.

2. The electrical circuit of claim 1, further comprising a power supply voltage source of a predetermined magnitude, wherein the operating parameter is the predetermined magnitude of the power supply voltage source.

3. The electrical circuit of claim 1, wherein the second sub-circuit includes a common-mode feedback circuit.

4. The electrical circuit of claim 3, wherein the common-mode feedback circuit includes an operational amplifier.

5. The electrical circuit of claim 4, wherein the operational amplifier has a first input which receives a first differential component of the composite signal, a second input which receives a second differential component of the composite signal, a third input which receives a common-mode voltage signal, and an output which provides a baseline correction current control signal.

6. The electrical circuit of claim 5, wherein the common-mode feedback circuit further includes a pair of transistors, each transistor having a respective input and wherein the output of the operational amplifier is coupled to the respective input of each of the transistors.

7. The electrical circuit of claim 1, wherein the second sub-circuit includes a current source.

8. The electrical circuit of claim 7, wherein the current source provides a constant baseline correction current control signal.

9. The electrical circuit of claim 1, wherein the second sub-circuit includes a resistor divider.

10. The electrical circuit of claim 9, wherein the resistor divider comprises a plurality of resistors, each of the resistors having a respective characteristic resistance.

11. The electrical circuit of claim 10, wherein the resistor divider provides a baseline correction current control signal that is related to the respective resistances of each of the resistors.

12. An electrical circuit in a communications channel, comprising:
- an active resistive summing circuit which produces a receive signal as a difference between a composite signal and a replica transmission signal, the composite signal comprising a transmission signal component and a receive signal component; and
- an analog baseline correction current control circuit which controls the magnitude of the composite signal,
- wherein the composite signal, the replica transmission signal, and an output of the analog baseline correction current are directly connected together at a common node of the active resistive summing circuit.

13. The electrical circuit of claim 12, further comprising a power supply voltage source of a predetermined magnitude.

14. The electrical circuit of claim 13, wherein the analog baseline correction current control circuit controls the magnitude of the composite signal to be less than the magnitude of the power supply voltage source.

15. The electrical circuit of claim 12, wherein the analog baseline correction current control circuit includes a common-mode feedback circuit.

16. The electrical circuit of claim 15, wherein the common-mode feedback circuit includes an operational amplifier.

17. The electrical circuit of claim 16, wherein the operational amplifier has a first input which receives a first differential component of the composite signal, a second input which receives a second differential component of the composite signal, a third input which receives a common-mode voltage signal, and an output which provides a baseline correction current control signal.

18. The electrical circuit of claim 17, wherein the common-mode feedback circuit further includes a pair of transistors, each transistor having a respective input and wherein the output of the operational amplifier is coupled to the respective input of each of the transistors.

19. The electrical circuit of claim 12, wherein the analog baseline correction current control circuit includes a current source.

20. The electrical circuit of claim 19, wherein the current source provides a constant baseline correction current control signal.

21. The electrical circuit of claim 12, wherein the analog baseline correction current control circuit includes a resistor divider.

22. The electrical circuit of claim 21, wherein the resistor divider comprises a plurality of resistors, each of the resistors having a respective characteristic resistance.

23. The electrical circuit of claim 22, wherein the resistor divider provides a current control signal that is related to the respective resistances of each of the resistors.

24. An electrical circuit in a communications channel, comprising:
- an active resistive summer having a first input which receives a composite signal that includes a transmission signal component and a receive signal component, a second input which receives a replica transmission signal, a third input which receives an analog baseline correction current, and an output which provides a receive signal which comprises the composite signal minus the replica signal; and
- a baseline correction current control circuit which controls the magnitude of the analog baseline correction current to thereby control the magnitude of the composite signal,
- wherein the composite signal, the replica transmission signal, and the analog baseline correction current are directly connected together at a common node of the active resistive summer.

25. The electrical circuit of claim 24, further comprising a power supply voltage source of a predetermined magnitude.

26. The electrical circuit of claim 25, wherein the magnitude of the analog baseline correction current is controlled to control the magnitude of the composite signal to be less than the magnitude of the power supply voltage source.

27. The electrical circuit of claim 25, wherein the magnitude of the analog baseline correction current is controlled to control the magnitude of the composite signal to be equal to the magnitude of the power supply voltage source.

28. The electrical circuit of claim 24, wherein the baseline correction current circuit includes a common-mode feedback circuit.

29. The electrical circuit of claim 28, wherein the common-mode feedback circuit includes an operational amplifier.

30. The electrical circuit of claim 29, wherein the operational amplifier has a first input which receives a first differential component of the composite signal, a second input which receives a second differential component of a composite signal, a third input which receives a common-mode voltage signal, and an output which provides a baseline correction current control signal.

31. The electrical circuit of claim 30, wherein the common-mode feedback circuit further includes a pair of transistors, each transistor having a respective input and wherein the output of the operational amplifier is coupled to the respective input of each of the transistors.

32. The electrical circuit of claim 24, wherein the baseline correction current control circuit includes a current source.

33. The electrical circuit of claim 32, wherein the current source provides a constant baseline correction current control signal.

34. The electrical circuit of claim 24, wherein the baseline correction current control circuit includes a resistor divider.

35. The electrical circuit of claim 34, wherein a plurality of resistors, respective characteristic resistance.

36. The electrical circuit of claim 35, wherein the resistor divider provides a baseline correction current control signal that is related to the respective resistances of each of the resistors.

37. A communication method for a communications channel, comprising:
- receiving at a first input a composite signal that includes a transmission signal component and a receive signal component;
- receiving at a second input a replica transmission signal;
- receiving at a third input an analog baseline correction current;
- providing an analog baseline correction current to substantially prevent the magnitude of the composite signal from exceeding a predetermined value of an operating parameter of the electrical circuit; and
- providing a receive signal comprising the composite signal minus the replica signal at an output, wherein the composite signal, the replica transmission signal, and the analog baseline correction current are directly connected together at a common node.

38. The method of claim 37, further comprising providing a power supply voltage source of a predetermined magnitude, wherein the operating parameter is the predetermined magnitude of the power supply voltage source.

39. The method of claim 37, wherein the analog baseline correction current is provided by a common-mode feedback circuit.

40. The method of claim 39, wherein the common-mode feedback circuit includes an operational amplifier.

41. The method of claim 40, further comprising:
receiving a first differential component of the composite signal at a first input of the operational amplifier;
receiving a second differential component of the composite signal at a second input of the operational amplifier;
receiving a common-mode voltage signal at a third of the operational amplifier; and
providing a baseline correction current control signal at an output of the operational amplifier.

42. The method of claim 41, further comprising receiving the baseline correction current control signal at an input of a first transistor and at an input of a second transistor.

43. The method of claim 37, wherein the baseline correction current is provided by a current source.

44. The method of claim 43, further comprising the step of providing a constant analog baseline correction current.

45. The method of claim 37, wherein the analog baseline correction current is provided by a resistor divider.

46. The method of claim 45, wherein the resistor divider comprises a plurality of resistors, each resistor having a respective characteristic resistance.

47. The method of claim 46, wherein the analog baseline correction current is related to the respective resistances of each of the resistors.

48. A communication method for a communications channel, comprising:
producing a receive signal as a difference between a composite signal and a replica transmission signal, the composite signal comprising a transmission signal component and a receive signal component;
controlling the magnitude of the composite signal;
receiving at a first input a first differential component of the composite signal;
receiving at a second input a second differential component of the composite signal;
receiving at a third input a common-mode voltage signal; and
providing at an output a baseline correction current control signal to control an analog baseline correction current,
wherein the composite signal, the replica transmission signal, and the baseline correction current control signal are directly connected together at a common node.

49. The method of claim 48, further comprising providing a power supply voltage source of a predetermined magnitude.

50. The method of claim 49, wherein the magnitude of the composite signal is controlled to be less than the magnitude of the power supply voltage source.

51. The method of claim 49, wherein the magnitude of the composite signal is controlled to be equal to the power supply voltage source.

52. The method of claim 48, wherein the magnitude of the composite signal is controlled by a common-mode feedback circuit.

53. The method of claim 52, wherein the common-mode feedback circuit includes an operational amplifier.

54. The method of claim 48, further comprising providing the output of the operational amplifier to an input of a first transistor and an input of a second transistor.

55. The method of claim 48, wherein the magnitude of the composite signal is controlled by a current source.

56. The method of claim 55, further comprising providing a constant baseline correction current control signal to control the magnitude of the composite signal.

57. The method of claim 48, wherein the magnitude of the composite signal is controlled by a resistor divider.

58. The method of claim 57, wherein the resistor divider comprises a plurality of resistors, each of the resistors having a respective characteristic resistance.

59. The method of claim 58, further comprising controlling the magnitude of the composite signal in relation to the respective resistances of each of the resistors.

60. A method for a communications channel comprising:
receiving at a first input a composite signal that includes a transmission signal component and a receive signal component;
receiving at a second input a replica transmission signal;
receiving at a third input an analog baseline correction current;
controlling the magnitude of the analog baseline correction current to thereby control the magnitude of the composite signal; and
providing at an output a receive signal which comprises the composite signal minus the replica signal,
wherein the composite signal, the replica transmission signal, and the analog baseline correction current are directly connected together at a common node.

61. The method of claim 60, further comprising providing a power supply voltage source of a predetermined magnitude.

62. The method of claim 61, wherein the magnitude of the analog baseline correction current is controlled to control the magnitude of the composite signal to be less than the magnitude of the power supply voltage source.

63. The method of claim 61, wherein the magnitude of the analog baseline correction current is controlled to control the magnitude of the composite signal to be equal to the magnitude of the power supply voltage source.

64. The method of claim 60, wherein the magnitude of the analog baseline correction current is controlled by a common-mode feedback circuit.

65. The method of claim 64, wherein the common-mode feedback circuit includes an operational amplifier.

66. The method of claim 65, further comprising:
receiving at a first input a first differential component of the composite signal;
receiving at a second input a second differential component of the composite signal;
receiving at a third input a common-mode voltage signal; and
providing at an output a baseline correction current control signal to control an analog baseline correction current.

67. The method of claim 66, further comprising providing the output of the operational amplifier to an input of a first transistor and an input of a second transistor.

68. The method of claim 60, wherein the magnitude of the analog baseline correction current is controlled by a current source.

69. The method of claim 68, further comprising providing a constant baseline correction current control signal.

70. The method of claim 60, wherein the magnitude of the analog baseline correction current is controlled by a resistor divider.

71. The method of claim 70, wherein the resistor divider comprises a plurality of resistors, each of the resistors having a respective characteristic resistance.

72. The method of claim 71, further comprising providing a baseline correction current control signal that is related to the respective resistances of each of the resistors.

73. An electrical circuit for a communications channel, comprising:
    means for receiving at a first input a composite signal that includes a transmission signal component and a receive signal component;
    means for receiving at a second input a transmission signal;
    means for receiving at a third input an analog baseline correction current;
    means for providing a receive signal comprising the composite signal minus the replica signal; and
    means for providing the analog baseline correction current to substantially prevent the magnitude of the composite signal from exceeding a predetermined value of an operating parameter of the electrical circuit,
    wherein the composite signal, the transmission signal, and the analog baseline correction current are directly connected together at a common node.

74. The electrical circuit of claim 73, further comprising means for providing a power supply voltage source of a predetermined magnitude, wherein the operating parameter is the predetermined magnitude of the power supply voltage source.

75. The electrical circuit of claim 73, wherein the analog baseline correction current is provided by a common-mode feedback circuit means.

76. The electrical circuit of claim 75, wherein the common-mode feedback circuit means includes operational amplifier means.

77. The electrical circuit of claim 76, further comprising:
    means for receiving a first differential component of the composite signal at a first input of the operational amplifier means;
    means for receiving a second differential component of the composite signal at a second input of the operational amplifier means;
    means for receiving a common-mode voltage signal at a third input of the operational amplifier; and
    means for providing a baseline correction current control signal at an output of the operational amplifier means.

78. The electrical circuit of claim 77, further comprising means for providing the baseline correction current control signal at an input of a first transistor and at an input of a second transistor.

79. The electrical circuit of claim 73, wherein current source means provide the analog baseline correction current.

80. The electrical circuit of claim 79, further comprising means for providing a constant analog baseline correction current.

81. The electrical circuit of claim 73, wherein resistor divider means provide the analog baseline correction current.

82. The electrical circuit of claim 81, wherein the resistor divider means comprises a plurality of resistors, each resistor having a respective characteristic resistance.

83. The electrical circuit of claim 82, wherein the analog baseline correction current is related to the respective resistances of each of the resistors.

84. An electrical circuit for a communications circuit, comprising:
    means for producing a receive signal as a difference between a composite signal and a replica transmission signal, the composite signal comprising a transmission signal component and a receive signal component;
    means for controlling the magnitude of the composite signal;
    means for receiving at a first input a first differential component of the composite signal;
    means for receiving at a second input a second differential component of the composite signal;
    means for receiving at a third input a common-mode voltage signal; and
    means for providing at an output analog baseline correction current control signal,
    wherein the composite signal, the replica transmission signal, and the analog baseline correction current control signal are directly connected together at a common node of the producing means.

85. The electrical circuit of claim 84, further comprising means for providing a power supply voltage source of a predetermined magnitude.

86. The electrical circuit of claim 85, wherein the means for controlling the magnitude of the composite signal control the magnitude of the composite signal to be less than the magnitude of the power supply voltage source.

87. The electrical circuit of claim 85, wherein the means for controlling the magnitude of the composite signal control the magnitude of the composite signal to be equal to the magnitude of the power supply voltage source.

88. The electrical circuit of claim 84, wherein the magnitude of the composite signal is controlled by common-mode feedback circuit means.

89. The electrical circuit of claim 88, wherein the common-mode feedback circuit means include operational amplifier means.

90. The electrical circuit of claim 84, further comprising means for providing the output of the operational amplifier means to an input of a first transistor and an input of a second transistor.

91. The electrical circuit of claim 84, wherein the magnitude of the composite signal is controlled by current source means.

92. The electrical circuit of claim 91, further comprising means for providing a constant analog baseline correction current control signal to control the magnitude of the composite signal.

93. The electrical circuit of claim 84, wherein the magnitude of the composite signal is controlled by resistor divider means.

94. The electrical circuit of claim 93, wherein the resistor divider means comprises a plurality of resistors, each of the resistors having a respective characteristic resistance.

95. The electrical circuit of claim 94, further comprising means for controlling the magnitude of the composite signal in relation to the respective resistances of each of the resistors.

96. An electrical circuit for a communications channel, comprising:
    means for receiving at a first input a composite signal that includes a transmission signal component and a receive signal component;
    means for receiving at a second input a replica transmission signal;
    means for receiving at a third input an analog baseline correction current;

means for controlling the magnitude of the analog baseline correction current to thereby control the magnitude of the composite signal; and means for providing at an output a receive signal which comprises the composite signal minus the replica signal, wherein the composite signal, the replica transmission signal, and the analog baseline correction current are directly connected together at a common node.

97. The electrical circuit of claim 96, further comprising means for providing a power supply voltage source of a predetermined magnitude.

98. The electrical circuit of claim 97, wherein the means for controlling the magnitude of the analog baseline correction current is controlled to be less than the magnitude of the means for providing a power supply voltage source of a predetermined magnitude.

99. The electrical circuit of claim 97, wherein the means for controlling the magnitude of the analog baseline correction current is controlled to be equal to the magnitude of the means for providing a power supply voltage source of a predetermined magnitude.

100. The electrical circuit of claim 97, wherein the magnitude of the analog baseline correction current is controlled by common-mode feedback circuit means.

101. The electrical circuit of claim 100, wherein the common-mode feedback circuit means includes operational amplifier means.

102. The electrical circuit of claim 101, further comprising:

means for receiving at a first input a first differential component of the composite signal;

means for receiving at a second input a second differential component of the composite signal;

means for receiving at a third input a common-mode voltage signal; and means for providing at an output a baseline correction current control signal.

103. The electrical circuit of claim 102, further comprising means for providing the output of the operational amplifier to an input of a first transistor and an input of a second transistor.

104. The electrical circuit of claim 96, wherein the magnitude of the analog baseline correction current is controlled by current source means.

105. The electrical circuit of claim 104, further comprising means for providing a constant analog baseline correction current control signal.

106. The electrical circuit of claim 96, wherein the magnitude of the analog baseline correction current is controlled by resistor divider means.

107. The electrical circuit of claim 106, wherein the resistor divider means comprises a plurality of resistors, each of the resistors having a respective characteristic resistance.

108. The electrical circuit of claim 107, further comprising means for providing a baseline correction current control signal that is related to the respective resistances of each of the resistors.

* * * * *